(12) United States Patent
Hogg et al.

(10) Patent No.: US 10,301,959 B2
(45) Date of Patent: May 28, 2019

(54) SEAL ASSEMBLY

(71) Applicant: Cummins Ltd, Huddersfield (GB)

(72) Inventors: Simon Hogg, Durham (GB); Michael Hilfer, Durham (GB)

(73) Assignee: Cummins Ltd., Huddersfield (GB)

( * ) Notice: Subject to any disclaimer, the term of this patent is extended or adjusted under 35 U.S.C. 154(b) by 373 days.

(21) Appl. No.: 14/894,791

(22) PCT Filed: Jun. 2, 2014

(86) PCT No.: PCT/GB2014/051683
§ 371 (c)(1),
(2) Date: Nov. 30, 2015

(87) PCT Pub. No.: WO2014/191780
PCT Pub. Date: Dec. 4, 2014

(65) Prior Publication Data
US 2016/0108751 A1  Apr. 21, 2016

(30) Foreign Application Priority Data
May 31, 2013  (GB) .................................. 1309769.6

(51) Int. Cl.
*F01D 11/04* (2006.01)
*F01D 11/10* (2006.01)
*F16J 15/40* (2006.01)

(52) U.S. Cl.
CPC .............. *F01D 11/04* (2013.01); *F01D 11/10* (2013.01); *F16J 15/40* (2013.01); *F05D 2220/32* (2013.01); *F05D 2240/55* (2013.01)

(58) Field of Classification Search
CPC . F01D 11/02; F01D 11/04; F01D 11/10; F16J 15/40; F16J 15/002; F05D 2200/32; F05D 2240/55
See application file for complete search history.

(56) References Cited

U.S. PATENT DOCUMENTS

| 4,311,431 A | * | 1/1982 | Barbeau | F01D 5/225 415/116 |
| 4,662,821 A | * | 5/1987 | Kervistin | F01D 11/001 415/116 |

(Continued)

FOREIGN PATENT DOCUMENTS

| EP | 2009248 A1 | 12/2008 |
| GB | 855040 A | 11/1960 |

(Continued)

OTHER PUBLICATIONS

International Search Report and Written Opinion issued by the European Patent Office, dated Aug. 20, 2014 for the related International Application No. PCT/GB2014/051683; 8 pages.

(Continued)

*Primary Examiner* — Woody A Lee, Jr.
*Assistant Examiner* — Su Htay
(74) *Attorney, Agent, or Firm* — Faegre Baker Daniels LLP

(57) ABSTRACT

A seal assembly for restricting fluid leakage flow through a fluid leakage cavity defined between a first component and second component that is rotatable about an axis relative to the first component, the seal assembly having a fluid jet outlet configured to admit a fluid jet into the fluid leakage cavity in an upstream direction which is inclined to the axis, a first flow restriction located downstream of the fluid jet outlet and at a location such that the fluid jet admitted from the fluid jet outlet would impinge on the first flow restriction once the fluid jet has turned to flow in an axial direction, and a second flow restriction located downstream of the first flow restriction. An axial flow turbine having a turbine rotor mounted within a housing may incorporate such a seal assembly in a fluid leakage cavity defined between the turbine rotor and the housing.

16 Claims, 25 Drawing Sheets

(56) References Cited

U.S. PATENT DOCUMENTS

| | | | | |
|---|---|---|---|---|
| 6,742,783 B1* | 6/2004 | Lawer | ................... | F01D 11/08 |
| | | | | 277/412 |
| 7,238,001 B2* | 7/2007 | Rushton | ................. | F01D 11/04 |
| | | | | 415/110 |
| 2007/0071593 A1* | 3/2007 | Rathmann | ............... | F01D 5/186 |
| | | | | 415/115 |
| 2009/0297341 A1 | 12/2009 | Turnquist et al. | | |
| 2010/0189542 A1* | 7/2010 | Maltson | ................. | F01D 5/225 |
| | | | | 415/1 |

FOREIGN PATENT DOCUMENTS

| | | | |
|---|---|---|---|
| GB | 2409247 | A | 6/2005 |
| GB | 2443117 | A | 4/2008 |
| JP | S63205404 | A | 8/1988 |
| JP | H08338537 | A | 12/1996 |
| WO | WO2012052740 | A1 | 4/2012 |

OTHER PUBLICATIONS

Search Report issued by the United Kingdom Intellectual Property Office, dated Dec. 4, 2013 for the related Application No. GB1309769.6; 5 pages.

\* cited by examiner

US 10,301,959 B2

SEAL ASSEMBLY

CROSS-REFERENCE TO RELATED APPLICATION

The present application is a National Stage of International Application No. PCT/GB2014/051683, filed Jun. 2, 2014, which claims priority to GB 1309769.6, filed May 31, 2013, the entire disclosures of which are hereby expressly incorporated herein by reference.

The present invention relates to a seal assembly for use in between two components between which there is relative rotational movement, particularly but not exclusively, a shrouded axial flow turbine rotatably mounted within a turbine housing in a turbomachine, such as an axial flow turbine expander of a waste heat recovery system.

An engine assembly typically comprises an internal combustion engine and may further comprise a turbocharger. A waste heat recovery system may be used to recover heat from the engine assembly and convert the recovered heat into usable power. The waste heat recovery system may be used to recover heat from engine exhaust gas and from an engine charge air cooler. Power derived from the waste heat recovery system may be used to generate electricity and/or to augment power output from the internal combustion engine.

A conventional waste heat recovery system uses a refrigerant fluid which is pumped around a closed loop. A heat exchanger is used to transfer heat from the engine (e.g. from exhaust gas) to the refrigerant, which is initially in liquid form. This heat causes the refrigerant liquid to vaporise. The refrigerant vapour passes to an expansion turbine (hereinafter referred to as a "turbine expander") and drives a turbine wheel or rotor of the turbine expander to rotate. Power is derived from the rotation of the turbine rotor.

The refrigerant vapour passes from the turbine expander to a condenser which is configured to cool and condense the refrigerant so that it returns to liquid form. The refrigerant liquid is then passed to the heat exchanger to complete the loop.

The turbine rotor of the waste heat recovery system is rotatably mounted on a turbine shaft within a housing. In some cases the turbine shaft may be provided with a gear or other power transfer coupling to augment the output of an internal combustion engine to which the waste heat recovery system is connected. In some cases the turbine shaft may be directly or indirectly connected to a further shaft, upon which may be mounted the gear or power transfer coupling.

The turbine rotor typically incorporates an array of blades which extend radially outwards from a central hub which is mounted on the turbine shaft. The radially outer edge of each blade is often connected to a circumferentially extending ring or shroud; as a result, a turbine rotor of this kind is typically referred to as a "shrouded turbine". In a shrouded turbine, the radially outer circumferentially extending surface of the shroud rotates at high speed adjacent to a wall of the housing, which is of course stationary. The shroud and the housing are designed so that the shroud rotates in close proximity to the housing wall to minimise the possibility of fluid being lost through the radial clearance between the shroud and the housing rather than flowing through the blades of the turbine as intended. It is common practice to provide a conventional seal, such as a labyrinth seal, in the space between the shroud of the turbine and the housing wall to minimise fluid leakage flow around the turbine wheel.

Much of the recent work aimed at improving performance beyond the level of conventional labyrinth seals has focused on designs that employ adaptable physical barriers to reduce leakage e.g. brush, leaf and finger seals etc. Improved sealing arrangements have also been developed that are based upon gas-curtain type fluidic jets. The jets create a blockage in the form of a cross-flow fluid 'curtain' which establishes a static pressure drop within the leakage path across the curtain. This pressure drop acts to effectively reduce the pressure gradient in the inlet region of the seal, thereby reducing the amount of leakage flow entering the seal. Despite recent advances in mechanical and aerodynamic sealing arrangements, a significant need still exists for a simple, robust, yet effective means of providing a seal between a pair of components between which there is relative rotation, such as a shrouded axial flow turbine and a turbine housing.

It is an object of the present invention to obviate or mitigate one or more problems associated with existing seals and/or axial flow turbines. Moreover, it is an object of the present invention to provide an improved or alternative seal assembly and/or an improved or alternative axial flow turbine.

According to a first aspect of the present invention there is provided an axial flow turbine comprising
 a turbine rotor mounted within a housing for rotation about a turbine axis,
 a fluid flow inlet passage upstream of said turbine rotor arranged to direct a first fluid towards the turbine rotor in a substantially axial direction,
 a fluid flow outlet passage downstream of said turbine rotor and
 a seal assembly provided in a fluid leakage cavity defined between the turbine rotor and the housing,
 wherein the seal assembly comprises
 a fluid jet outlet configured to admit a second fluid into the fluid leakage cavity in an upstream direction which is inclined to the turbine axis,
 a first flow restriction located downstream of the fluid jet outlet and at a location such that second fluid admitted from the fluid jet outlet would impinge on the first flow restriction once the second fluid has turned to flow in an axial direction, and
 a second flow restriction located downstream of the first flow restriction.

Detailed investigations into the flow characteristics of fluid jet seals has led to the realisation that the kinetic energy of the fluid jet can, unless carefully controlled, negatively influence the sealing capability of the seal. It has surprisingly been found that combining a fluid jet with at least two downstream flow restrictions, the most upstream of which is positioned at a specific, predetermined position relative to the fluid jet, results in a sealing arrangement that exhibits significantly improved performance as compared to conventional sealing arrangements including aerodynamic and/or physical seals.

The fluid jet outlet is preferably configured to admit the second fluid into the fluid leakage cavity in an upstream direction which is inclined to the turbine axis so as to partially oppose the flow of the first fluid through the fluid leakage cavity. That is, in a direction transverse to the turbine axis such that, upon ejection from the outlet, a component of the flow of the second fluid initially opposes the flow of the first fluid through the fluid leakage cavity, which will be in a generally axial direction, disregarding any swirl, and a component of the flow of the second fluid is initially perpendicular to the flow of the first fluid through the fluid leakage cavity. The second fluid may be ejected so as to be initially admitted into the fluid leakage cavity in an upstream direction having an axial component and a radial component. The direction in which the second fluid initially enters the fluid leakage cavity may be at an angle of around 20 to 70° to the turbine axis, 30 to 60° to the turbine axis, 40 to 50° to the turbine axis or around 45° to the turbine axis.

The fluid jet outlet may be defined by a wall of the housing which lies radially outboard of the turbine rotor. The sealing assembly may comprise one, two, three or more fluid jet outlets. Where a plurality of fluid jet outlets are provided, they may be arranged in a regular or irregular array. For example, a plurality of fluid jet outlets may be provided in a regular circumferential array surrounding the radially outer periphery of the turbine rotor. By way of a further alternative, the fluid jet outlet may be provided in the form of one or more continuous or discontinuous channels extending circumferentially around the wall of the housing which faces into the fluid leakage cavity. It will be appreciated that in order for the second fluid to be able to be admitted into the fluid leakage cavity against the flow of the first fluid through the fluid leakage cavity so that it can function acceptably as an element of the seal assembly, the pressure of the second fluid exiting the fluid jet outlet must be greater than the pressure of the first fluid passing the fluid jet outlet. The fluid jet outlet may be connected to a conduit extending through the housing to a source of pressurised fluid, that is, a fluid with a pressure greater than the expected pressure of the first fluid as it flows along the fluid leakage cavity passed the fluid jet outlet. If the pressure of the second fluid leaving the fluid jet outlet is too low the second fluid will not traverse a sufficient distance across the radial width of the fluid leakage cavity to adequately disrupt the leakage flow of the first fluid. The pressure of the second fluid preferably exceeds a threshold required to cause the second fluid to cross at least around half of the radial width of the fluid leakage cavity before its momentum has been fully turned into the direction of the first fluid flowing along the fluid leakage cavity.

The turbine rotor is preferably provided with a cylindrical ring or 'shroud' which extends circumferentially around the radially outer periphery of the turbine rotor. Hereinafter, such a turbine rotor will be described as a 'shrouded turbine rotor'.

An axial section of the fluid leakage cavity may be a radial clearance defined between the radially outer periphery of the turbine rotor, e.g. the shroud of a shrouded turbine rotor, and a circumferentially extending section of an inner wall of the housing which lies radially outboard of the radially outer periphery of the turbine rotor.

A flow-controlling element, such as a stator supporting one or more vanes, may be provided in between the fluid flow inlet passage and the turbine rotor to pre-condition or pre-swirl, the first fluid before it impinges on the turbine rotor to optimise turbine efficiency.

The first flow restriction is preferably located downstream of the fluid jet outlet and at a location such that, in use, second fluid admitted from the fluid jet outlet would impinge on the first flow restriction once the second fluid has turned to flow in an axial direction under the influence of flow of the first fluid through the fluid leakage cavity. The first flow restriction is positioned at this location to disrupt the axial flow of the second fluid through the fluid leakage cavity and thereby prevent the kinetic energy of the second fluid from undesirably influencing the leakage flow of the first fluid through the fluid leakage cavity. In the absence of the first flow restriction the kinetic energy of the second fluid admitted by the fluid jet would accelerate the first fluid passing along the fluid leakage cavity beyond the second flow restriction located further downstream, thereby negatively affecting the performance of the sealing assembly as a whole.

The first flow restriction may be spaced from the centre of the fluid jet outlet by a distance that is approximately one half to twice the radial width of the fluid leakage cavity. That is, where the spacing of the first flow restriction to the centre of the fluid jet outlet is x, and the radial width of the fluid leakage cavity is y, x may be equal to or greater than 0.5 y or it may be equal to or less than 2 y. Furthermore, the relationship between x and y may be closer to parity, for example, $0.75y \leq x \leq 1.5y$, or the first flow restriction may be spaced from the centre of the fluid jet outlet by approximately the same distance as the separation between the section of the wall of the housing which radially overlies the turbine rotor (the radial width of the fluid leakage cavity), i.e. $x \approx y$.

The first flow restriction may be located on an opposite side of the fluid leakage cavity to the side from which the second fluid is admitted into the fluid leakage cavity via the fluid jet outlets. The first flow restriction may be provided on the radially inboard side of the fluid leakage cavity while the fluid jet outlet may be provided on the radially outboard side of the fluid leakage cavity. For example, the first flow restriction may be a projection extending radially outwards from the radially outer periphery of the turbine rotor or the shroud of a shrouded turbine rotor.

A single first flow restriction may be provided, or a plurality of flow restrictions may be provided. It may be desirable to provide a first flow restriction in register with each fluid jet outlet. Alternatively, it may be desirable to associate two or more first flow restrictions of similar or dissimilar size and/or shape with each fluid jet outlet. As a further alternative, the first flow restriction may be provided as a continuous or discontinuous rim extending radially outwardly around the circumference of the radially outer periphery of the turbine rotor or the shroud of a shrouded turbine rotor. It will also be appreciated that any of the aforementioned alternative configurations may be used in any desirable combination.

The first flow restriction may extend across any desirable amount of the radial width of the fluid leakage cavity provided it can effect its intended function of causing second fluid admitted from the fluid jet to impinge upon its surface once the second fluid has turned to flow in an axial direction. The first flow restriction may extend across up to around 90% of the radial width of the fluid leakage cavity, up to around 70%, up to around 50%, or up to around 30% of the radial width of the fluid leakage cavity. The first flow restriction may extend across at least 5% of the radial width of the fluid leakage cavity, at least 15% or at least 25% of the radial width of the fluid leakage cavity.

The or each first flow restriction can be of any desirable shape, again, provided it can perform its intended function. It may have a regular axial cross-sectional profile, or it may be irregular. It may incorporate surfaces which extend axially and/or radially, and/or which are inclined to the axial or radial directions. Any non-axial or non-radial surfaces may be linearly inclined, non-linearly inclined, concave or convex. The first flow restriction may have any desirable axial extent; it may extend across 5% or less of the axial length of the fluid leakage cavity, or it may be larger and extend across 10 to 20% of the axial length of the fluid leakage cavity. Alternatively, the first flow restriction may be defined by a section of the turbine rotor or turbine rotor shroud downstream of the fluid jet outlet at a location to ensure that the second fluid, when ejected from the fluid jet outlet, impinges on that section of the turbine rotor or turbine rotor shroud before it has turned completely to flow in the axial direction. In an embodiment described below with reference to FIG. 6, the first flow restriction is in the region of a downstream corner of the turbine rotor shroud at the connection of the axially extending region of the fluid leakage cavity and the radially extending outlet region of the fluid leakage cavity. This region around the corner serves to prevent the second fluid being ejected from the fluid jet outlet in such a way that the kinetic energy of the second fluid carries it into the outlet region of the fluid leakage cavity without the second fluid having been turned to flow axially by interaction with the first fluid leakage flow. As discussed in more detail in the Examples, the spacing of the fluid jet outlet from the corner of the shroud to avoid this undesirable effect is a function of the pressure differential between the first and second fluids, the axial width of the conduit through which the second fluid passes to the fluid jet outlet and the angle to the turbine axis at which the second fluid is initially directed into the oncoming first fluid leakage flow.

The second flow restriction downstream of the first flow restriction may take any convenient form. It may be similar in one or more respects, e.g. size, shape, radial extent, axial extent, etc, to the form of the first flow restriction or it may be different in all respects. The second flow restriction may be a conventional aerodynamic or physical seal, such as a radially extending fin, a labyrinth seal, a brush seal, a leaf seal, an abradable seal, etc. Alternatively, the second flow restriction may be defined by a section of the wall of the housing downstream of the first flow restriction which lies radially and/or axially closer to the turbine rotor than the section of the wall of the housing which defines the fluid jet outlet. In an embodiment described below with reference to FIG. 6, the second flow restriction is an outlet region of the fluid leakage cavity defined as a relatively tight axial clearance between a radially extending section of the wall of the housing and a radial surface of the downstream end of the turbine shroud.

While the second flow restriction may take any convenient form as described above, in a preferred embodiment, it extends radially inwards from the same side of the fluid leakage cavity from which the second fluid is admitted via the fluid jet outlet. Moreover, in an embodiment where the first flow restriction extends radially outwards it is preferred that the second flow restriction extends radially inwards from the opposite side of the fluid leakage cavity from which the first flow restriction extends. Taking the embodiments described below with reference to FIGS. 4 and 5, the fluid jet outlet and second flow restriction may be associated with the housing wall which lies radially outboard of the turbine shroud with which the first flow restriction is associated.

In order for the second flow restriction to be considered as being 'downstream' of the first flow restriction, it will be appreciated that all that is required is for the most upstream feature of the second flow restriction to be downstream of the most upstream feature of the first flow restriction. That is, the first and second flow restrictions can radially overlie one another and the second flow restriction still be considered as being downstream of the first flow restriction provided the first flow restriction extends axially further upstream than the second flow restriction. A non-limiting, exemplary embodiment of such an arrangement is described below with reference to FIG. 5.

A second aspect of the present invention provides a method for sealing a fluid leakage cavity in an axial flow turbine, the turbine comprising a turbine rotor mounted within a housing for rotation about a turbine axis, a fluid flow inlet passage upstream of said turbine rotor arranged to direct a first fluid towards the turbine rotor in a substantially axial direction, a fluid flow outlet passage downstream of said turbine rotor and a seal assembly provided in said fluid leakage cavity defined between the turbine rotor and the housing, wherein the method comprises directing the first fluid towards the turbine rotor in a substantially axial direction, a portion of the first fluid flowing through the turbine rotor and a further portion flowing through the fluid leakage cavity admitting a second fluid from a fluid jet outlet into the fluid leakage cavity in an upstream direction which is inclined to the turbine axis, providing a first flow restriction downstream of the fluid jet outlet and at a location such that second fluid admitted from the fluid jet outlet impinges on the first flow restriction once the second fluid has turned to flow in an axial direction after contacting the further portion of the first fluid flowing through the fluid leakage cavity, and providing a second flow restriction downstream of the first flow restriction to restrict the flow of a mixture of said first and second fluids further through the fluid leakage cavity.

According to a third aspect of the present invention there is provided a turbomachine having an axial flow turbine according to the first aspect of the present invention as defined above. The turbomachine may be an axial flow turbine expander of a waste heat recovery system.

A fourth aspect of the present invention provides a waste heat recovery system comprising an axial flow turbine according to the first aspect of the present invention.

A fifth aspect of the present invention provides a seal assembly for restricting fluid leakage flow through a fluid leakage cavity defined between a first component and second component that is rotatable about an axis relative to the first component, the seal assembly comprising a fluid jet outlet configured to admit a fluid jet into the fluid leakage cavity in an upstream direction which is inclined to the axis, a first flow restriction located downstream of the fluid jet outlet and at a location such that the fluid jet admitted from the fluid jet outlet would impinge on the first flow restriction once the fluid jet has turned to flow in an axial direction, and a second flow restriction located downstream of the first flow restriction.

It will be appreciated that the seal assembly of the fifth aspect of the present invention shares the same basic features of the seal assembly of the first aspect of the present invention described above, however it is not limited to use in any particular machine. Accordingly, preferred and optional features of the seal assembly of the first aspect of the present invention may also be applied in any technically compatible combination to the seal assembly according to the fifth aspect of the present invention. Moreover, it will be appreciated that the seal assembly of the fifth aspect of the present invention and the method according to the sixth aspect of the present invention defined below may be employed in any machine where a seal is required between two components between which there is relative rotational movement, examples of which include turbines of many different types and geometries, such as gas turbines and steam turbines.

A sixth aspect of the present invention provides a method for sealing a fluid leakage cavity defined between a first component and second component that is rotatable about an axis relative to the first component, the method comprising
  directing a first fluid towards the second component in a substantially axial direction, a portion of the first fluid flowing through the second component and a further portion flowing through the fluid leakage cavity
  admitting a fluid jet into the fluid leakage cavity in an upstream direction which is inclined to the axis,
  providing a first flow restriction downstream of the fluid jet and at a location such that the fluid jet impinges on the first flow restriction once the fluid jet has turned to flow in an axial direction after contacting the further portion of the first fluid flowing through the fluid leakage cavity, and
  providing a second flow restriction downstream of the first flow restriction to restrict the flow of a mixture of said first fluid and said jet fluid further through the fluid leakage cavity.

Specific embodiments of the present invention will now be described, by way of example only, with reference to the accompanying drawings in which.

Figure 18:
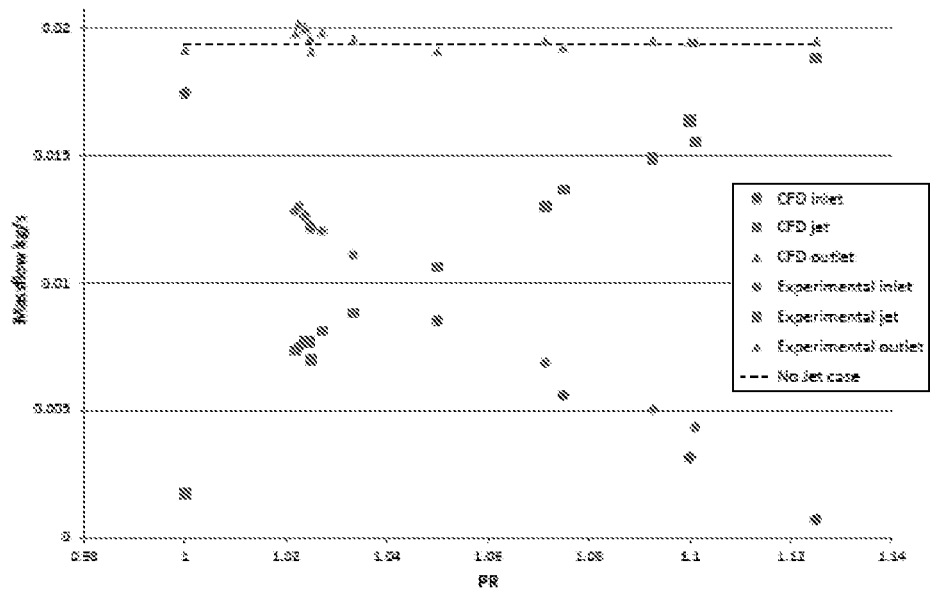
Figure 19:
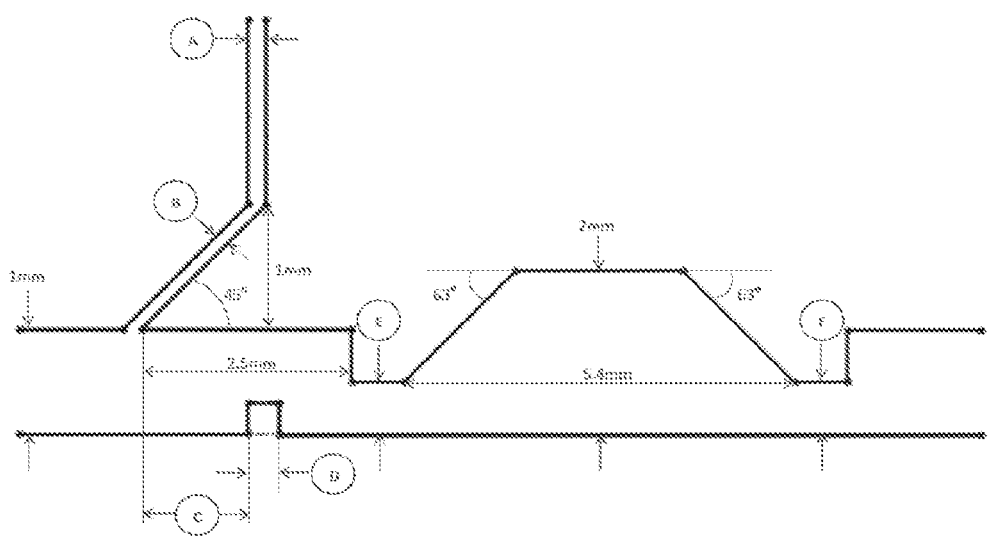
Figure 20:
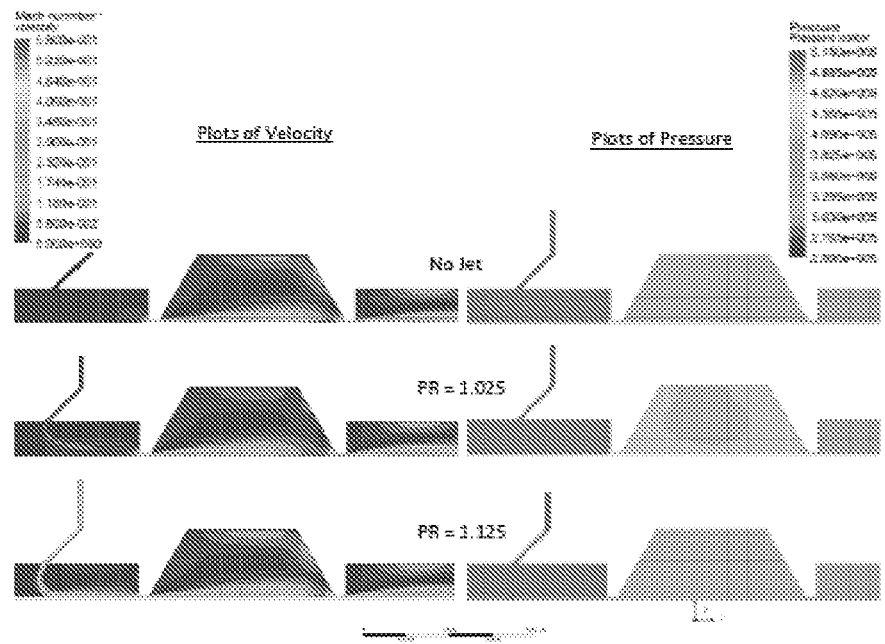
Figure 21:
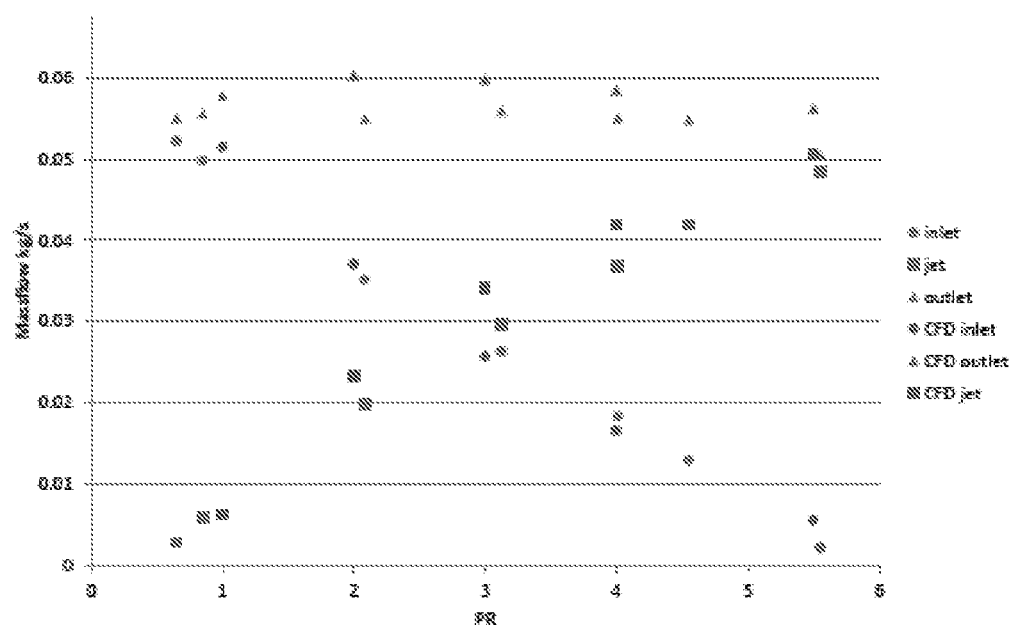
Figure 22:
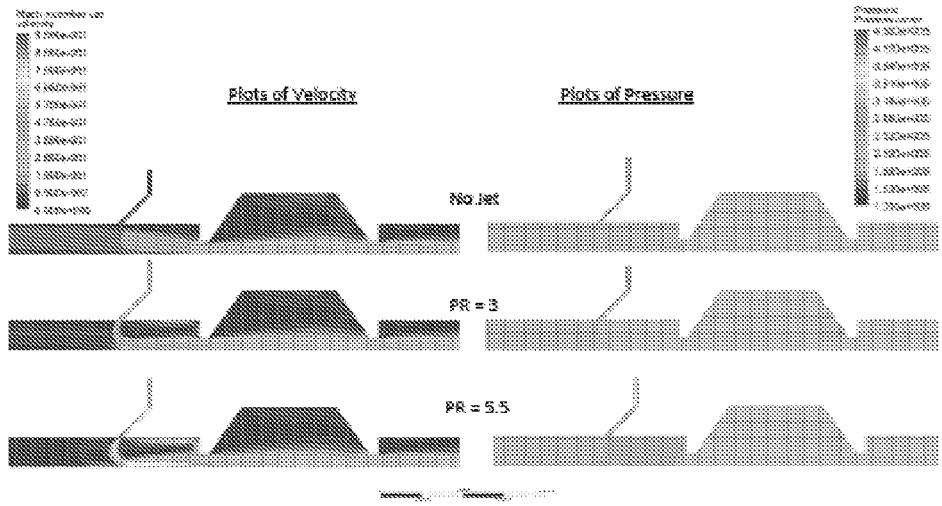
Figure 23:
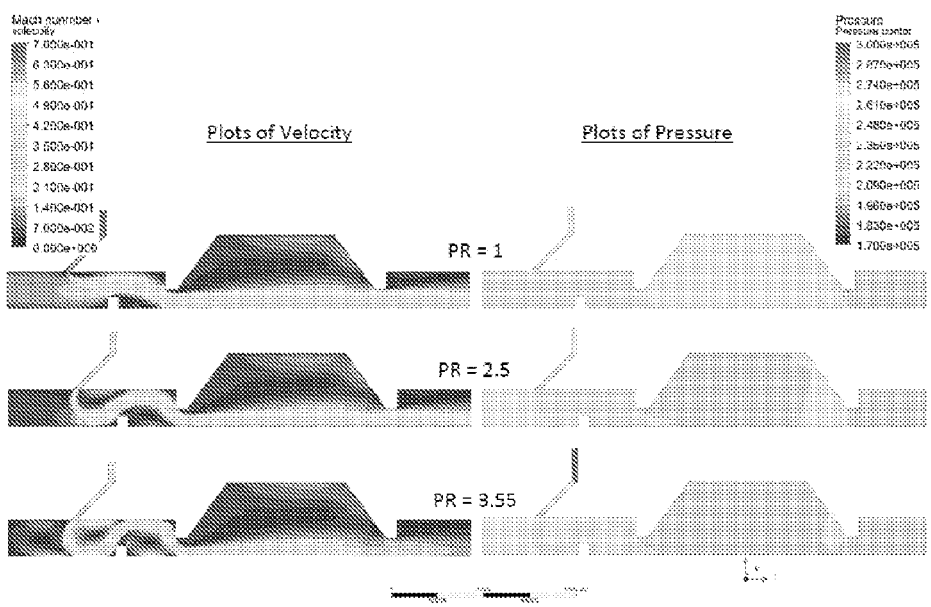
Figure 24:
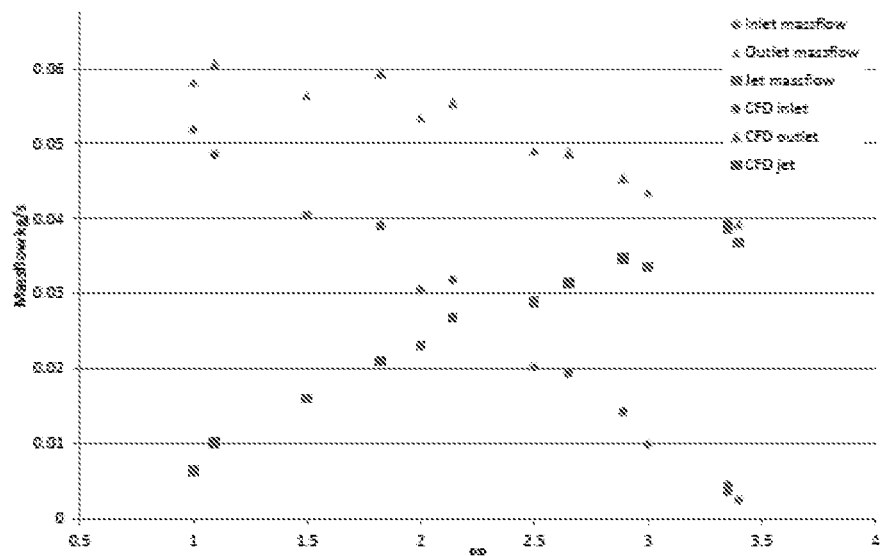
Figure 25:
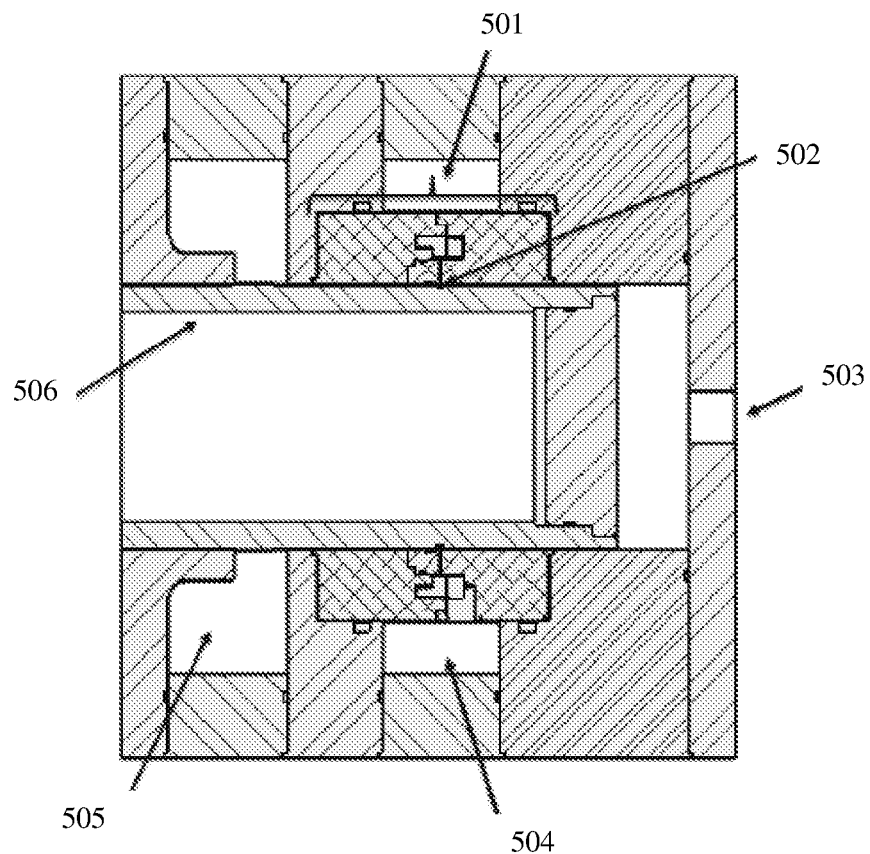
Figure 26:
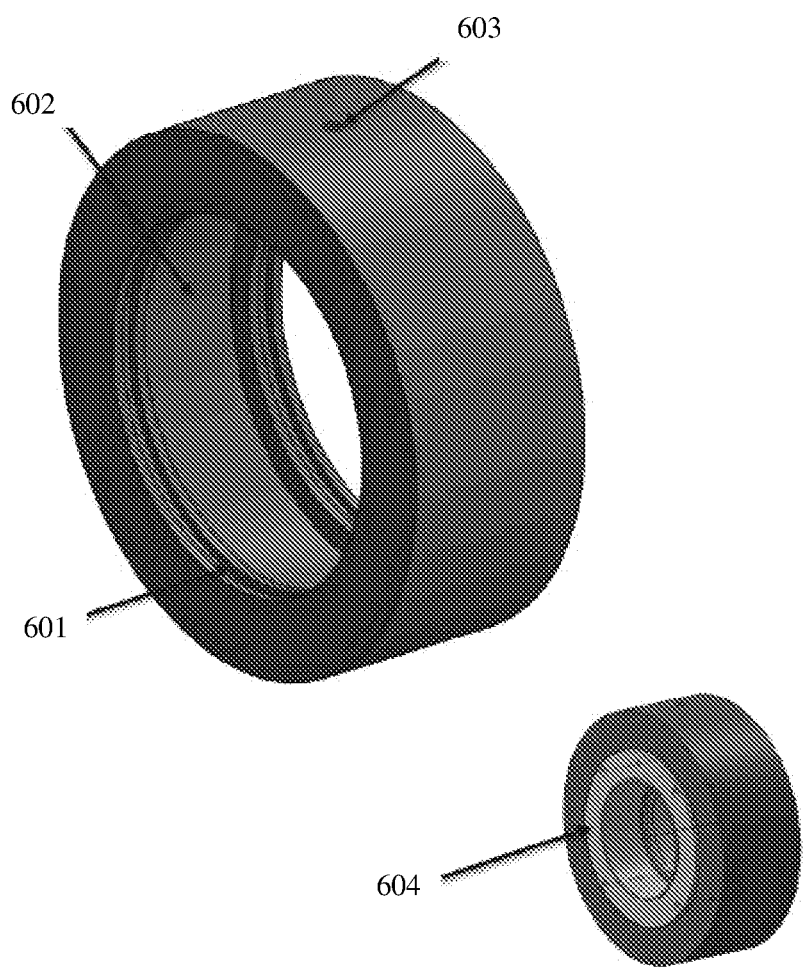
Figure 27:
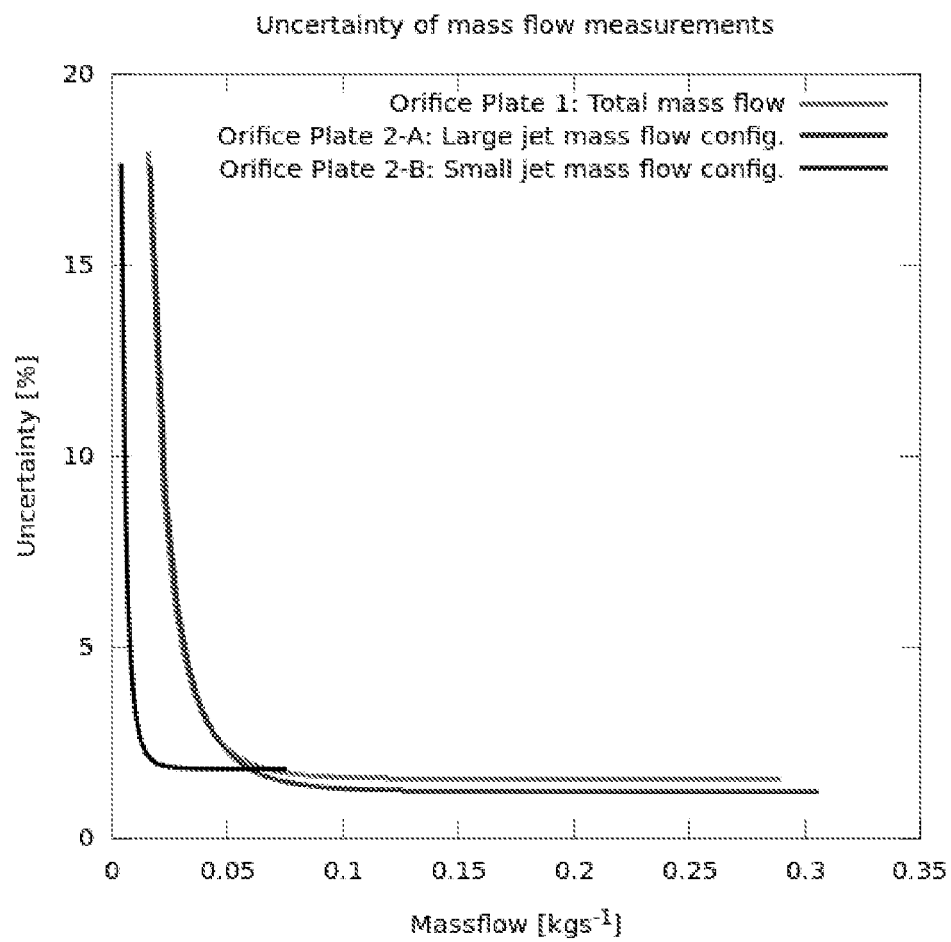
Figure 28:
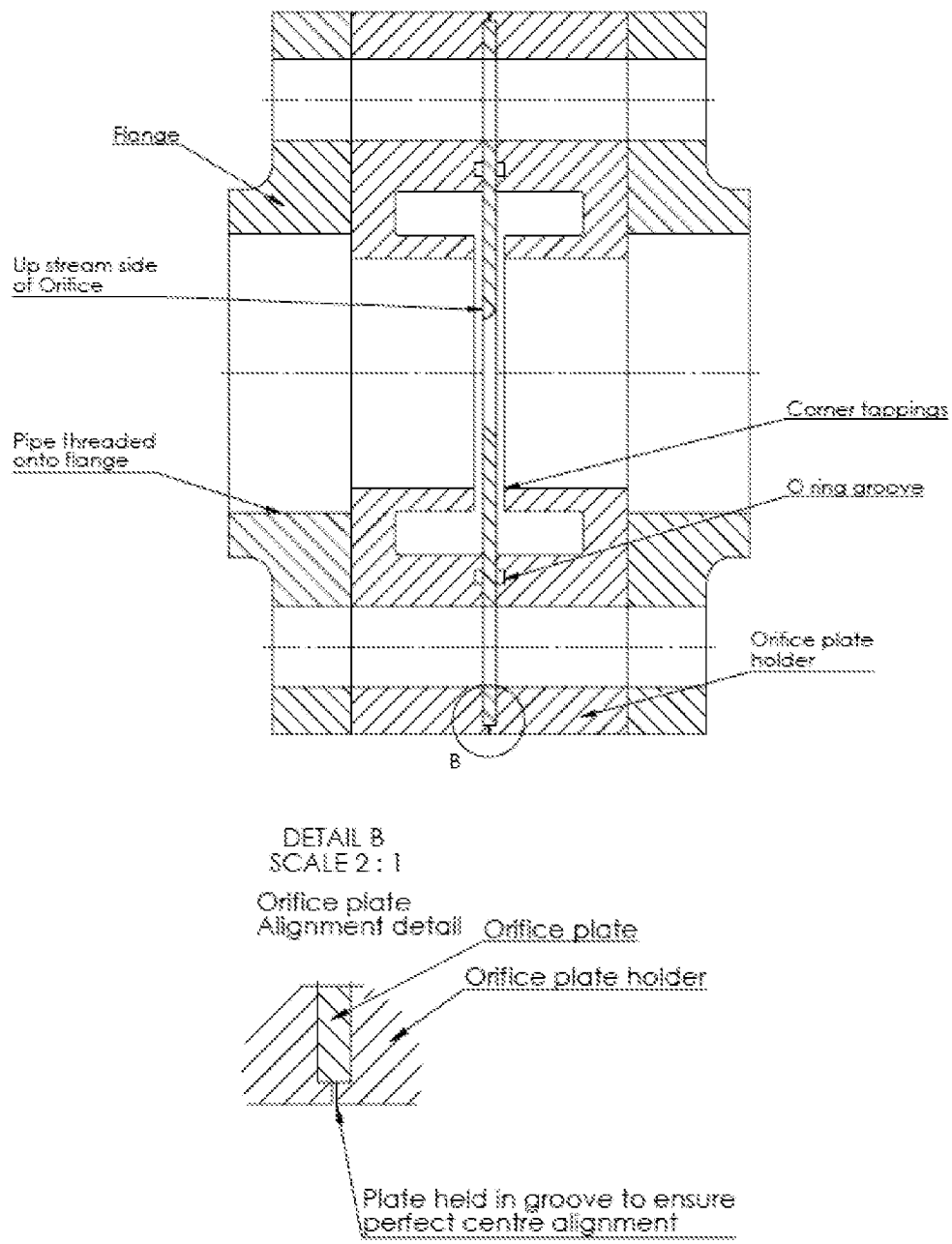
Figure 29:
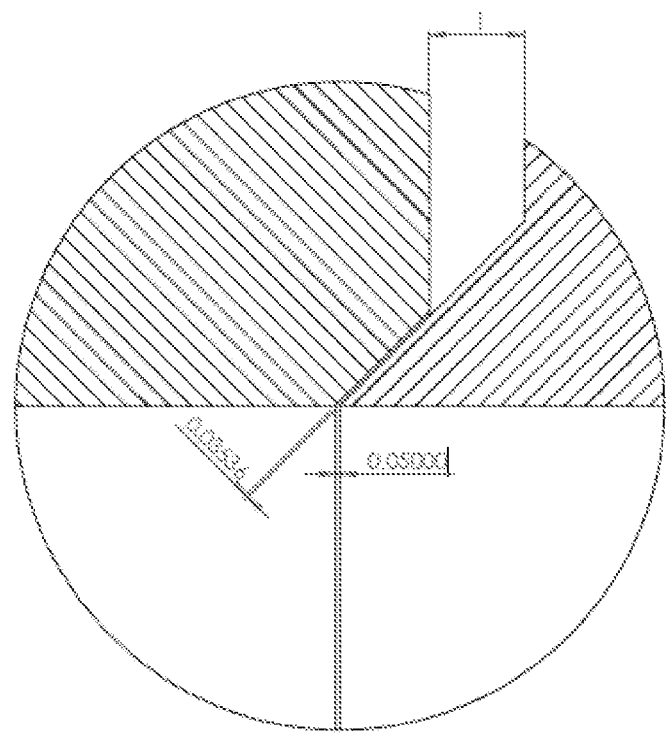
Figure 30:
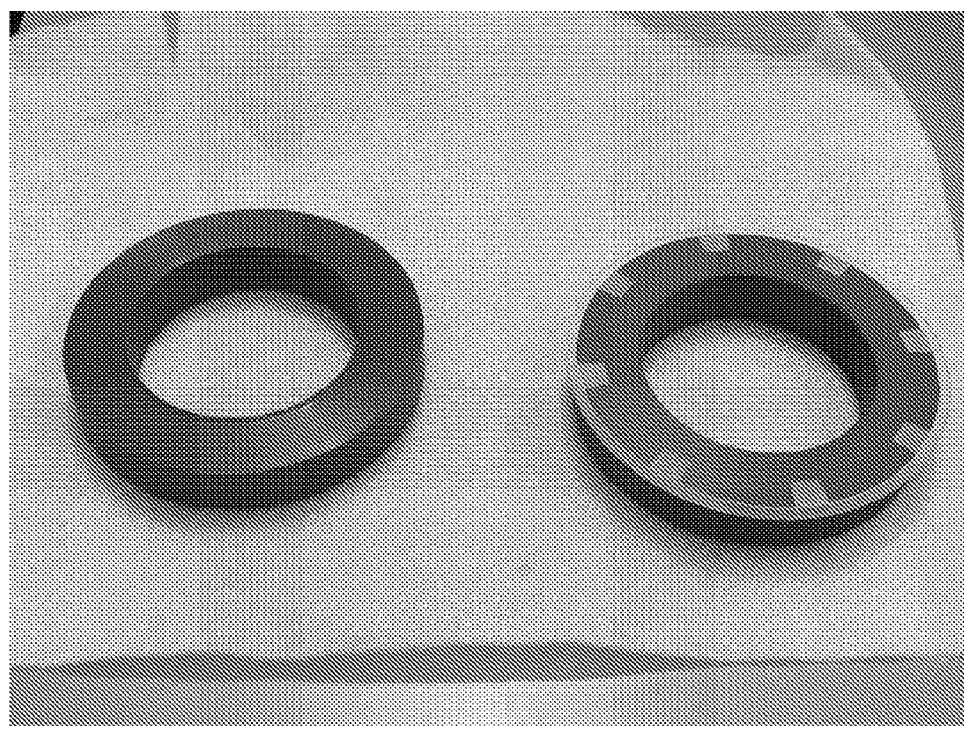
Figure 31:
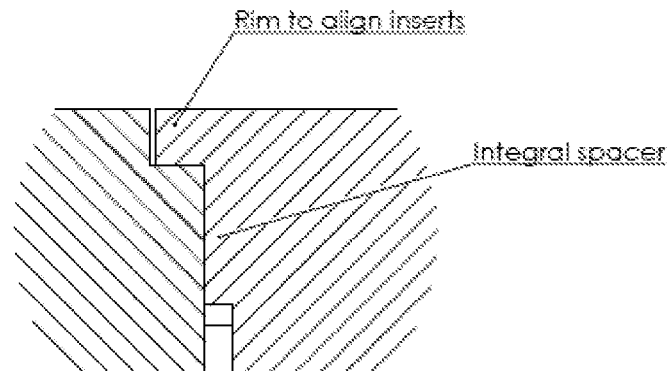
Figure 32:
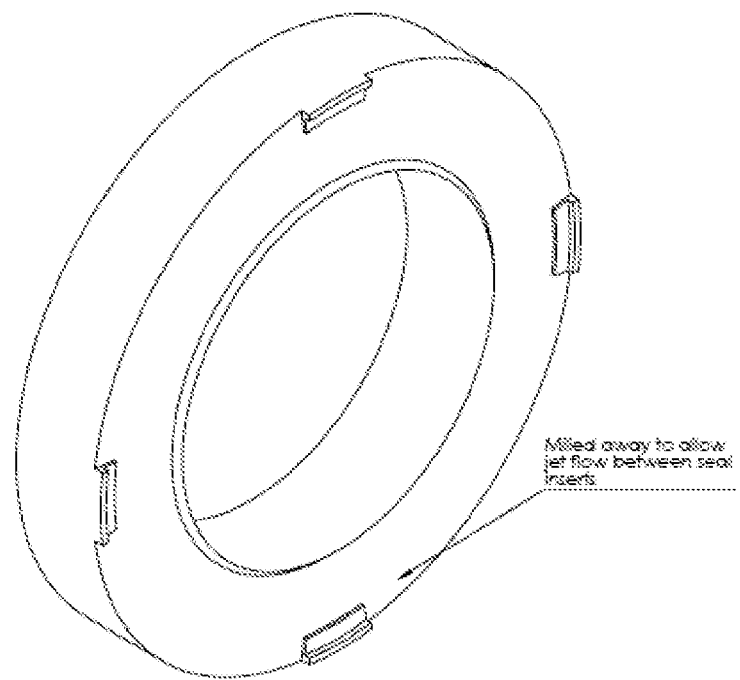
Figure 33:
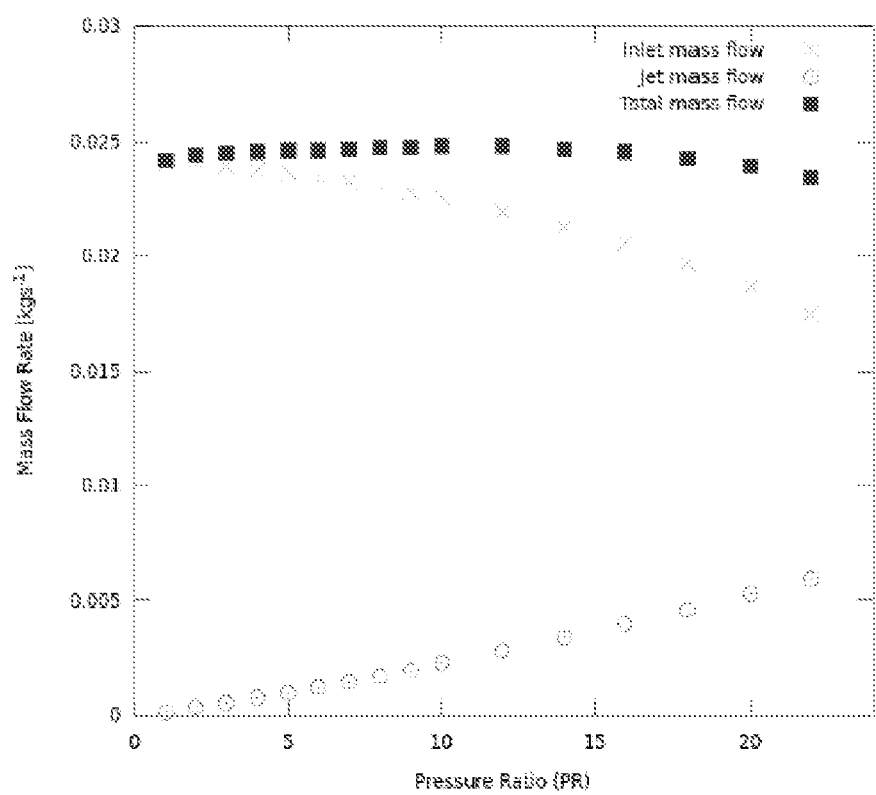
Figure 34:
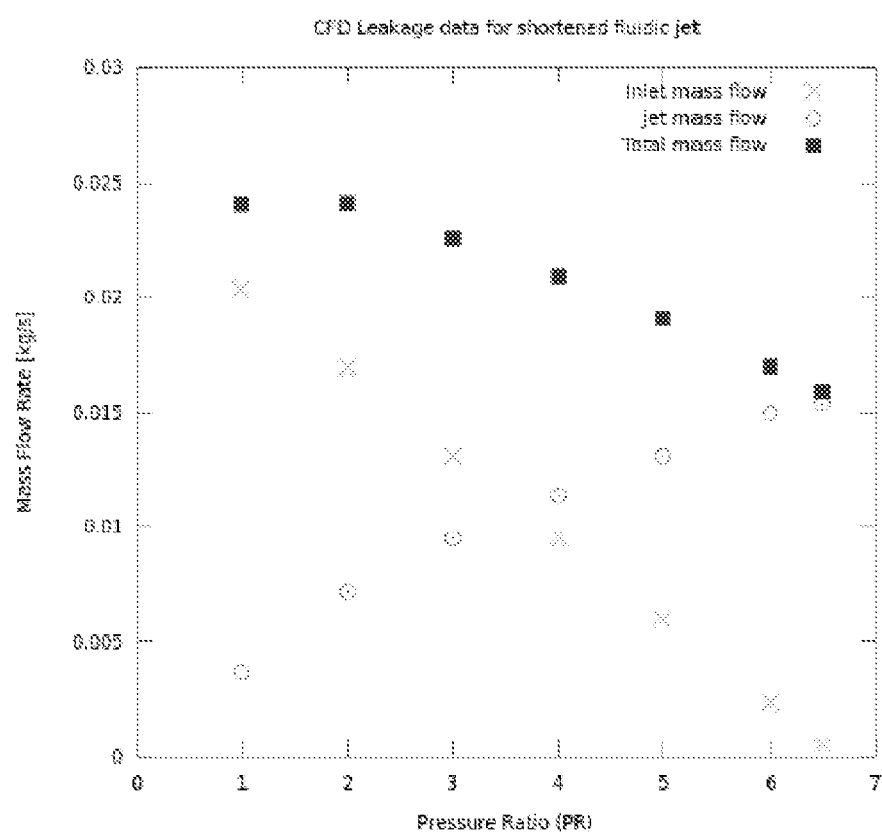
Figure 35:
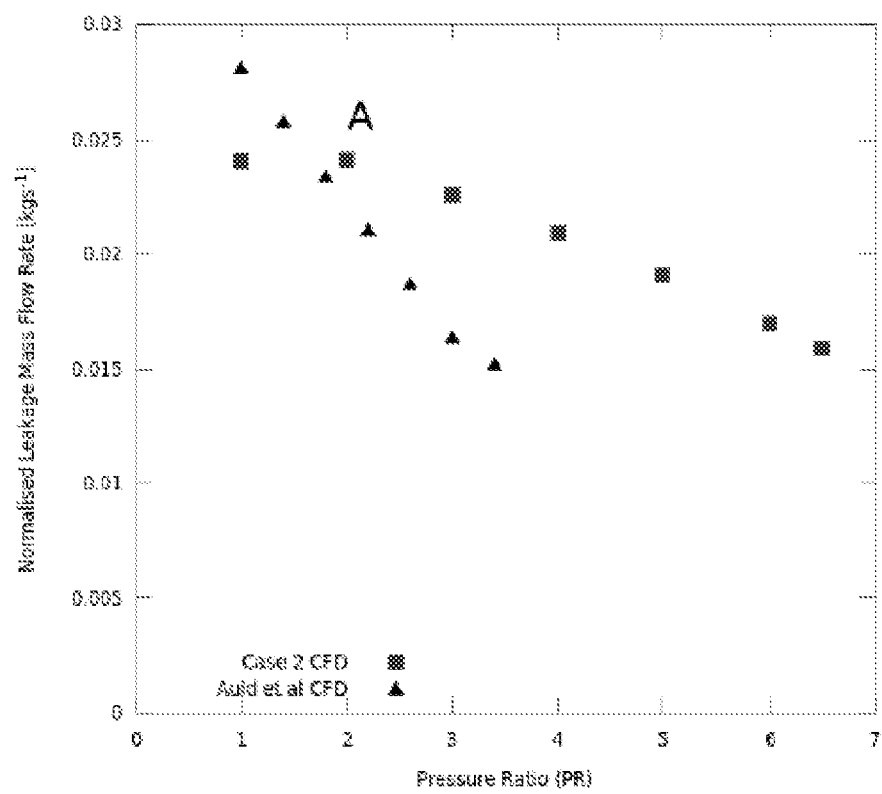
Figure 36:
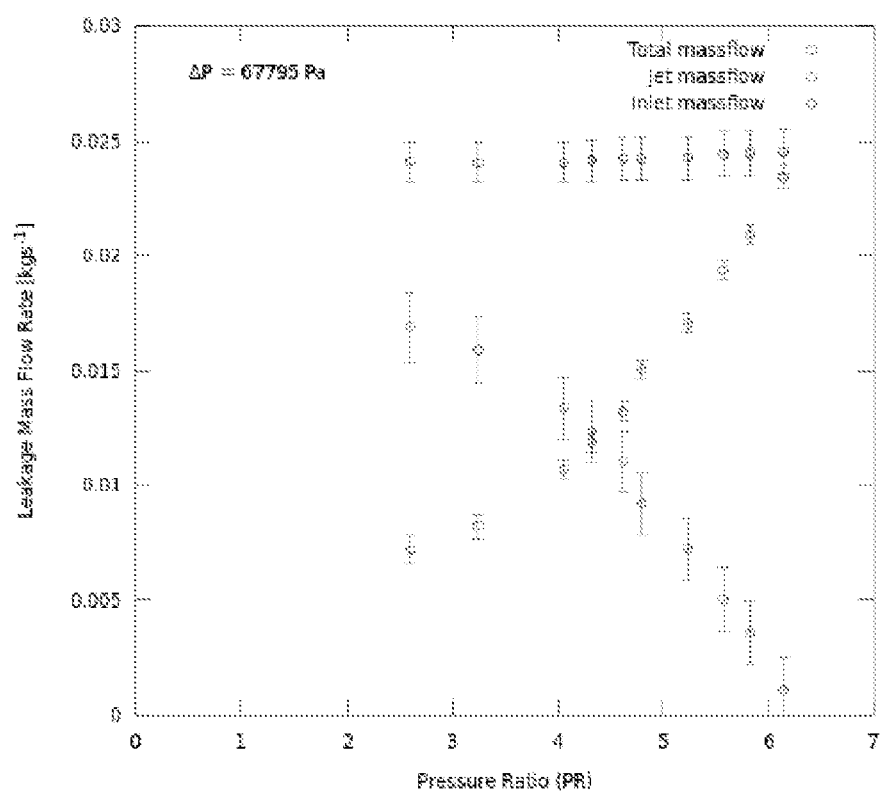

FIG. 18 is a graph showing CFD and experimental results for a 0.07 mm downstream restriction and a 0.17 mm jet. Massflow is plotted against pressure ratio (PR). The CFD 'no jet' case is also shown for reference;

FIG. 19 is a diagram showing the geometries used in the tests and labelling of features referenced in Tables 7 and 8 below;

FIG. 20 shows colour plots of pressure and Mach number illustrating the effect of the jet at different values of pressure ratio (PR) for the 0.07 mm downstream restriction tested;

FIG. 21 is a graph of massflow against pressure ratio (PR) showing CFD and experimental results of a 0.42 mm downstream restriction and a 0.175 mm jet;

FIG. 22 shows colour plots of pressure and Mach number illustrating the effect of the jet at different values of pressure ratio (PR) for the 0.42 mm downstream restriction tested;

FIG. 23 shows colour plots of pressure and Mach number illustrating the effect of the jet at different values of PR for a 0.5 mm downstream restriction with a 0.3 mm square blocker;

FIG. 24 is a graph of massflow against pressure ratio (PR) showing CFD and experimental results of a 0.42 mm downstream restriction and a 0.175 mm jet;

FIG. 25 is a drawing showing a section view of the re-designed test rig used in Example 2;

FIG. 26 is a CFD model showing the design of the new auxiliary insert test rig;

FIG. 27 shows uncertainty associated with the measurement of mass flow for each orifice plate referred to in Appendix C;

FIG. 28 is an axial cross-sectional view of the new orifice plate design referred to in Appendix C;

FIG. 29 is a cross sectional drawing of the simple fluidic jet, with critical dimensions;

FIG. 30 shows two fluidic seal inserts before they were installed in the Rig. A rapid prototype ring is shown on the right hand side of the figure;

FIG. 31 shows detail of a fluidic seal insert alignment and integral spacer referred to in Appendix D;

FIG. 32 shows an orthorgraphic drawing of a downstream fluidic seal insert referred to in Appendix D;

FIG. 33 shows the leakage mass flow rates for the case 1 CFD simulation referred to in Appendix D;

FIG. 34 shows the leakage mass flow rates for the case 2 CFD simulation referred to in Appendix D;

FIG. 35 shows CFD Total leakage mass flow rate for case 2 and prototype turbo-expander (from [3]);

FIG. 36 shows experimental results for the simple jet, including uncertainty in mass flow measurement.

Figure 1:
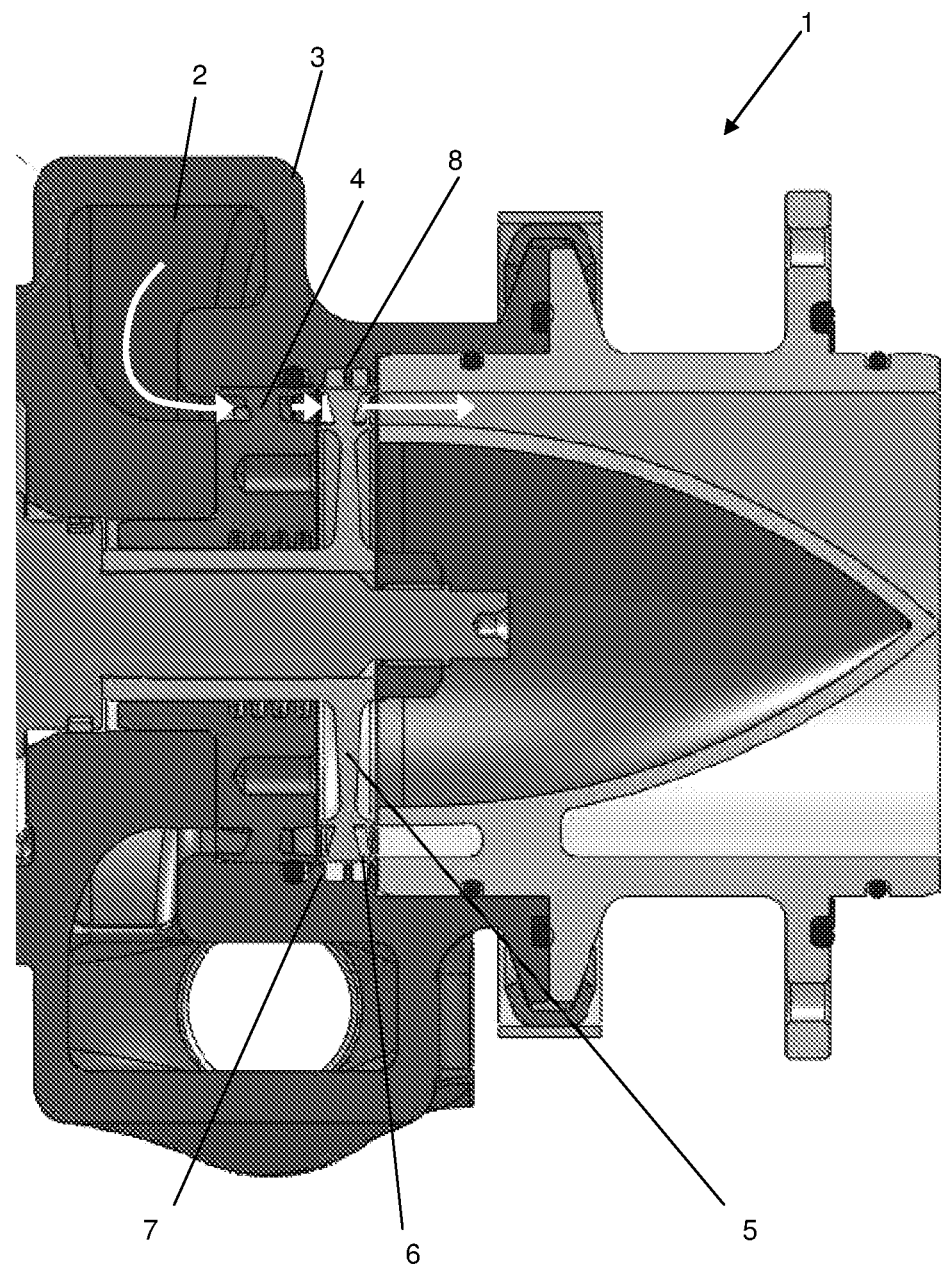
FIG. 1 is a schematic sectioned view of a prior art single stage axial flow turbine incorporating a shrouded turbine wheel (bearing system omitted for clarity)

FIG. 1 illustrates a prior art a single stage axial flow turbine 1 suitable for use in a waste heat recovery system of an internal combustion engine. High pressure fluid, such as refrigerant vapour generated by thermal contact between liquid refrigerant and waste heat recovered from the engine, is applied to an inlet scroll 2 defined by a housing 3 of the turbine 1. The path of the vapour is shown in FIG. 1 using three arrows. The vapour is turned axially in the inlet scroll 2 before it expands across a stator 4, which in this specific embodiment consists of twelve vanes arranged to introduce a swirl angle of 80° into the vapour. In this embodiment, the turbine 1 is designed to operate with a very high pressure ratio (>5.0) and so the flow through the stator 4 is choked. It will be appreciated that any number and arrangement of vanes, and/or choked or unchoked flow conditions, may be used to produce any desired swirl angle, or indeed the stator 4 may be omitted altogether if appropriate for a particular application. As shown in FIG. 1, the flow of swirling vapour exiting the stator 4 then passes to a turbine wheel or rotor 5. In this embodiment, the rotor 5 incorporates thirty-four blades, although any desirable number or arrangement may be used. A shroud 6 extends circumferentially around a radially outer periphery of the blades of the rotor 5.

Exemplary, non-limiting, parameters for a typical axial flow turbine of the kind shown in FIG. 1 are set out below in Table 1.

TABLE 1

Turbine Design Parameters

| | |
|---|---|
| Rotor Diameter | 63 mm |
| Nominal Operating Speed | 50,000 rpm |
| Rotor Blade Height | 4.125 mm |
| Shroud Axial Length | 8.0 mm |

The shroud 6 and the housing 3 are designed so that the shroud 6 rotates in close proximity to a wall 7 of the housing 3 which radially overlies the shroud 6 to minimise the possibility of vapour being lost through a radial clearance between the shroud 6 and the housing wall 7 rather than flowing through the rotor 5. In the embodiment shown in FIG. 1 a conventional labyrinth seal 8 is provided in the radial clearance between the shroud 6 and the housing wall 7 to minimise vapour leakage flow around the rotor 5 via the radial clearance and therefore maximise the efficiency of the turbine 1.

Figure 2:
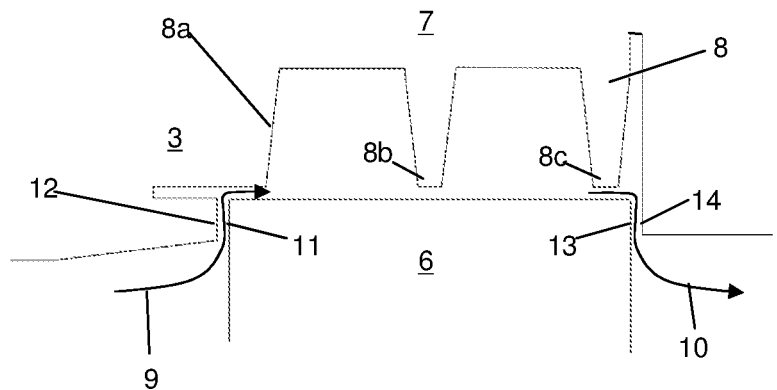
FIG. 2 is a detailed view of a section of FIG. 1 focusing on an upper region of a labyrinth seal adjacent to the shroud of the turbine wheel.

A more detailed view of the labyrinth seal 8 is shown in FIG. 2. Vapour leaking around the rotor 5 does so with the high levels of swirl momentum that are induced in the vapour by the stator 4. Arrow 9 in FIG. 2 represents vapour leaking into the radial clearance between the shroud 6 and the housing wall 7, while arrow 10 represents vapour exiting the radial clearance. The tangential velocity component of this swirling vapour leakage flow is typically greater than the rotational speed of the shroud 6.

After passing around the rotor 5, the leakage flow re-enters and mixes with the main flow of vapour immediately downstream of the rotor 5, before being exhausted from the turbine 1 in the axial direction.

The particular design of labyrinth seal 8 shown in FIGS. 1 and 2 features three radially extending labyrinth restrictions 8a, 8b, 8c, although any number or design of restrictions may be used. In addition to the radial restrictions 8a, 8b, 8c, the sealing arrangement depicted in FIGS. 1 and 2 also comprises a first relatively tight axial clearance between an upstream radial surface 11 of the shroud 6 and a wall 12 of the housing 3 which defines an inlet to the radial clearance between the shroud 6 and the housing wall 7, and a second relatively tight axial clearance between a downstream radial surface 13 of the shroud 6 and a wall 14 of the housing 3 which defines an outlet to the radial clearance. The radial clearance and two axial clearances together define a fluid leakage cavity. The sealing arrangement serving to restrict the undesirable flow of vapour around the rotor 5 through the fluid leakage cavity is therefore made up of the three radial restrictions 8a, 8b, 8c, of the labyrinth seal 8 together with the tight axial clearances at the inlet and outlet of the radial clearance. It is known that density effects mean that the greatest pressure drop within the fluid leakage cavity is carried by the last or most-downstream restriction in any multi-labyrinth seal system and so, in the arrangement shown in FIGS. 1 and 2, it is the tight axial clearance at the outlet of the fluid leakage cavity that exerts the greatest influence on the leakage flow.

Figure 3:
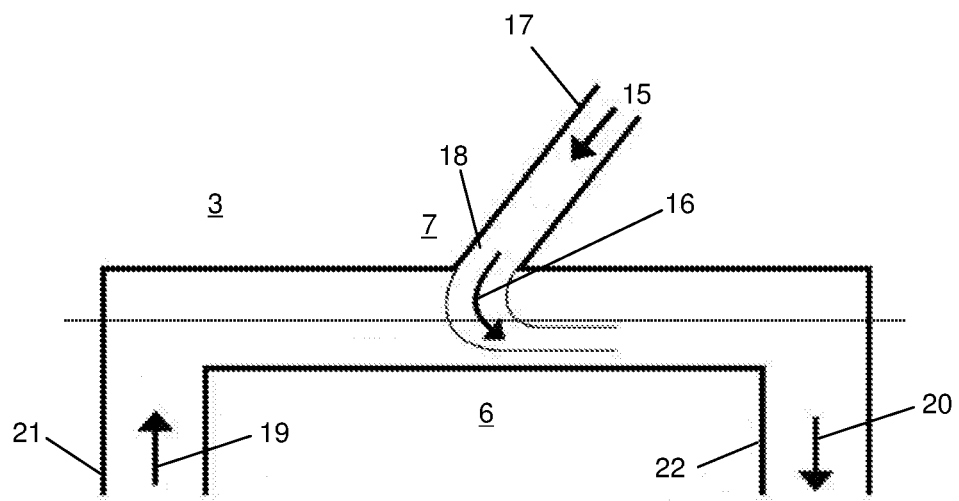
FIG. 3 is a schematic representation of an alternative prior art sealing arrangement for a shrouded turbine wheel in which a fluidic-jet replaces the labyrinth seal of the FIG. 2 arrangement.

FIG. 3 illustrates a fluidic jet aerodynamic sealing arrangement applied to a turbine expander of the same general type discussed above in relation to FIGS. 1 and 2. FIG. 3 is a similar close up view of the sealing arrangement as shown in FIG. 2 but in which the labyrinth seal 8 of FIG. 2 has been replaced with a fluidic jet seal as will now be described. In FIG. 3, the shroud 6 again rotates in close proximity to the wall 7 of the housing 3 but now the flow of vapour through the radial clearance defined between the shroud 6 and the wall 7 is hindered by a pressure curtain defined by the ingress of a high pressure fluid jet which is admitted into the leakage flow path in the direction of arrows 15 and 16 from a jet conduit 17 via one or more orifices 18 defined in the wall 7 which surrounds the shroud 6. Arrow 16 illustrates how the fluidic jet is turned and mixes with the vapour leakage flow passing along the fluid leakage cavity in the direction of arrows 19 and 20 from an inlet 21 to an outlet 22.

The jet enters the fluid leakage cavity about half way along the axial length of the shroud 6 in a direction which opposes the leakage flow. In the embodiment shown in FIG. 3 the jet conduit 17 is orientated at an angle of around 45° to the turbine axis, which is typical in fluidic jet seals. As the incoming high pressure jet mixes with the prevailing flow of vapour along the fluid leakage cavity, a static pressure drop is required to turn the jet flow to the same direction as that of the vapour leakage flow. This causes a sudden drop in static pressure across the fluid leakage cavity in the region where the jet flow enters the fluid leakage cavity via the orifice(s) 18. The presence of a fluidic jet acts to increase static pressure in the fluid leakage cavity upstream of the jet orifice(s) 18 and to reduce it downstream of the orifice(s) 18 compared to a turbine which incorporates neither the labyrinth seal of FIGS. 1 and 2, nor the fluidic jet seal of FIG. 3. The higher pressure upstream of the fluidic jet reduces the pressure gradient in the inlet 21 to the fluid leakage cavity, and so less vapour leakage flow enters the inlet 21 leaving a greater proportion of the vapour to flow through the rotor 5 as intended.

As mentioned above, the presence of the fluid jet acts to increase the pressure in the fluid leakage cavity upstream of the jet and decrease it downstream of the jet, compared to the 'no-jet' case. This will reduce the pressure gradient in the region of the outlet 22 of the fluid leakage cavity and so the leakage flow exiting from the fluid leakage cavity must be reduced compared to the equivalent no-jet case. As long as the fluidic jet seal is not 'over-blown' (discussed in more detail below), the flow exiting from the outlet 22 of the fluid leakage cavity must be the sum of the flow into the fluid leakage cavity inlet 21 plus the fluidic jet flow. So, there must always be a net overall leakage reduction benefit for any jet flow up to the point that the fluidic jet seal becomes over-blown.

If the fluid jet supply pressure is too low then the fluid jet will not traverse a sufficient distance across the radial width of the vapour leakage flow between the shroud 6 and the wall 7 of the housing 3 to create the 'fluid curtain' required to provide effective sealing. To provide an effective seal, it is generally desirable for the fluid jet supply pressure to exceed a threshold required to cause the fluid jet to traverse at least around half of the radial width of the radial clearance between the shroud 6 and the housing wall 7 (denoted by the dotted line in FIG. 3) before its momentum has been fully turned into the direction of vapour flowing along the fluid leakage cavity.

If the fluid jet supply pressure is too high it is possible to reverse the vapour leakage flow. Under these conditions, the jet fluid entering the clearance between the shroud 6 and wall 7 of the housing 3 splits, with a proportion of it flowing back upstream along the fluid leakage cavity, exiting the fluid leakage cavity through its inlet 21 into the inlet flow of the rotor 5. Operation of an aerodynamic seal under these conditions is described as being 'over-blown'. As would be appreciated to the skilled person, operation of a fluidic jet seal under over-blown conditions has a negative impact on turbine performance since the jet fluid that is being forced back out through the inlet of the fluid leakage cavity mixes with the vapour immediately upstream of the rotor 5. Consequently, the over-blown condition represents a performance threshold for aerodynamic seals of the kind shown in FIG. 3, akin to stall of an aerofoil.

In general in fluidic jet seals, as the inlet pressure, and hence the mass flow of the jet fluid, is increased, the vapour leakage mass flow through the inlet to the leakage flow path will be reduced. This situation continues until the momentum of the fluidic jet is just sufficient to prevent any flow from entering the leakage flow path via its inlet. Any further increase in jet supply pressure will result in the seal becoming over-blown. It is therefore conventional to design fluidic seals with jet conditions that allow some margin before the seal becomes over-blown, akin to the to stall margin applied during the design of aerofoils.

Figure 4:
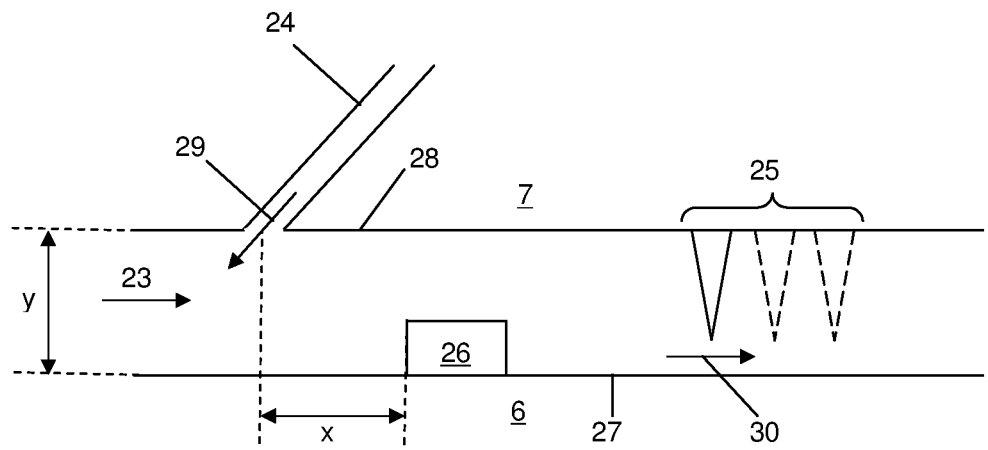
FIG. 4 is a schematic representation of a first embodiment of a sealing arrangement for an axial flow turbine incorporating a shrouded turbine wheel according to the present invention.

Referring now to FIG. 4, there is shown a first embodiment of a sealing arrangement according to the present invention which can be used in place of the labyrinth seal 8 of FIGS. 1 and 2, and the fluidic jet of FIG. 3. The shroud 6 and wall 7 of the housing 3 have the same general arrangement as shown in FIGS. 2 and 3 with the prevailing direction of leakage fluid flow being in the direction of arrow 23. The sealing arrangement shown in FIG. 4 comprises a fluidic jet 24 disposed upstream of a labyrinth seal 25, which includes one radially extending leakage flow restriction (shown in solid lines), but which may, if desired, include multiple radially extending leakage flow restrictions (shown in dotted lines). The sealing arrangement shown in FIG. 4 also incorporates an intermediate flow restriction 26 in between the fluid jet 24 and the labyrinth seal 25. The intermediate flow restriction 26 is disposed on the opposite side 27 of the fluid leakage cavity to the side 28 upon which the fluid jet enters the fluid leakage cavity via one or more orifices 29 in the housing wall 7. While the fluid jet may be admitted via one or more discrete orifices 29, it will be appreciated that the outlet for the fluid jet may take any desirable form and may, for example, be a continuous or discontinuous channel extending circumferentially around the wall 7 of the housing 3 which faces into the fluid leakage cavity.

In this specific embodiment, the intermediate flow restriction 26 is connected to the radially outer periphery of the shroud 6. The intermediate flow restriction 26 may be formed as a separate component to the shroud 6 and then connected to the shroud using any desirable means of connection, such as brazing, or the intermediate flow restriction 26 may be formed integrally with the shroud 6 such that the intermediate flow restriction 26 and the shroud 6 are produced as a single, unitary structure. The distance over which the intermediate flow restriction 26 extends radially from side 27 of the fluid leakage cavity is selected to ensure that it presents a restriction to the high pressure jet fluid as it turns to flow in the same direction as the prevailing vapour leakage flow. In this way, the intermediate flow restriction 26 prevents the kinetic energy of the jet fluid from undesirably influencing the vapour leakage flow encountering the downstream labyrinth seal 25 at arrow 30. In the absence of the intermediate flow restriction 26, even if the fluidic jet was operated at a jet pressure beyond the theoretical threshold required to provide an effective seal, as described above, the kinetic energy of the fluidic jet would accelerate vapour leakage flow passed the downstream labyrinth seal 25, thereby negatively affecting the performance of the sealing arrangement as a whole. The skilled person may previously have been of the opinion that supplementing a conventional mechanical seal, such as a labyrinth seal, with an aerodynamic seal, such as fluidic jet, to provide what might have been considered a 'blown mechanical seal', would provide an enhanced sealing arrangement as compared to either type of seal in isolation. However, the devisors of the present invention have determined that the opposite is in fact true; simply augmenting a mechanical seal with an aerodynamic seal, or vice versa, results in a more complicated and costly sealing arrangement with reduced performance benefit, and may in fact result in a less effective sealing arrangement than could be achieved using either type of seal separately.

In the specific embodiment shown in FIG. 4, a particularly preferred arrangement is depicted in which the intermediate flow restriction 26 is located so that its most upstream feature is provided a distance x upstream of the centre of the orifice(s) 29, which approximately matches the radial width y of the radial clearance between the shroud 6 and the housing wall 7. It is generally preferred that the most upstream feature of the intermediate flow restriction 26 is located upstream of the centre of the orifice(s) 29 by a distance which is greater than or equal to around one half of the radial width of the radial clearance between the shroud 6 and the housing wall 7 and less than or equal to around double the radial width of the radial clearance between the shroud 6 and the housing wall 7, i.e. $0.5y \leq x \leq 2y$.

The flow restriction in between the fluidic jet and the downstream flow restriction, e.g. the intermediate flow restriction 26 of the FIG. 4 embodiment, may take any convenient size and shape provided it can function to prevent the kinetic energy of the jet fluid from undesirably influencing the vapour leakage flow encountering the downstream flow restriction. While the embodiment of the intermediate flow restriction shown in FIG. 4 has a simple rectangular cross-section, it may include one or more ramped and/or arcuate surfaces facing upstream, downstream, or both upstream and downstream. The ramped or arcuate sections may be arranged to direct incident fluid radially outwards if the downstream flow restriction (e.g. labyrinth seal 25) extends radially inwards from the wall 7 of the housing 3 as shown in the FIG. 4 embodiment. If the downstream flow restriction takes some other form, then the form of the intermediate flow restriction can be adapted to ensure that it achieves the optimum level of 'pre-conditioning' of the vapour leakage flow after it has passed the fluidic jet and before it impinges on the downstream flow restriction to achieve the desired degree of sealing.

Figure 5:
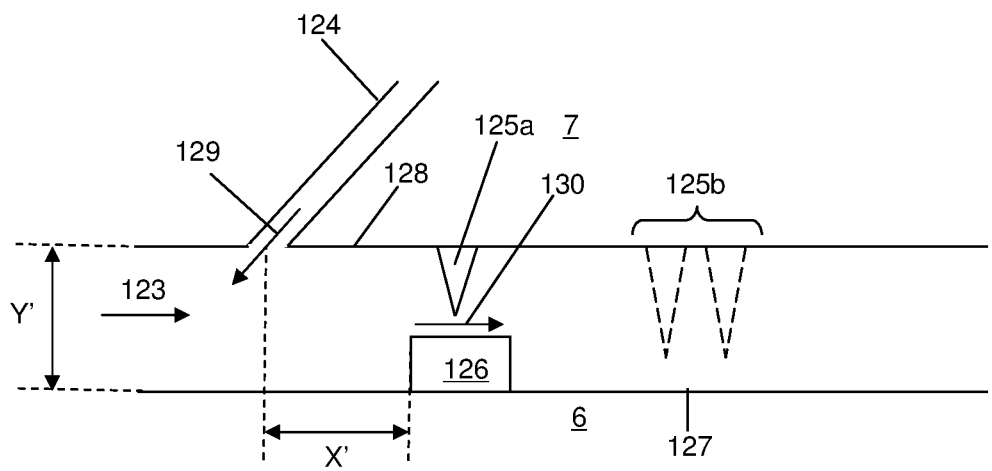
FIG. 5 is a schematic representation of a second embodiment of a sealing arrangement for an axial flow turbine incorporating a shrouded turbine wheel according to the present invention.

FIG. 5 illustrates an alternative embodiment of the sealing arrangement of the present invention to that shown in FIG. 4, in which the downstream flow restriction is located more upstream than in FIG. 4. In FIG. 5, the shroud 6 and the wall 7 of the housing 3 remain unchanged from the arrangements shown in FIGS. 1 to 4.

Components similar to those illustrated in FIG. 4 take the same reference numbers in FIG. 5 save for being increased by 100.

In FIG. 5, the general arrangement of the fluid jet 124 and the intermediate flow restriction 126 is the same as in FIG. 4, the axial spacing x' of the intermediate flow restriction 126 from the centre of the fluid jet orifice(s) 129 again being between around a half and double the radial width y' of the radial clearance between the shroud 6 and the housing wall 7. In FIG. 5, however, the downstream flow restriction 125 is now composed of a first radially extending flow restriction 125a which axially overlies the intermediate flow restriction 126, and optionally, one or more second radially extending flow restrictions 125b, which may define, for example, a conventional labyrinth seal. Despite the first component of the downstream flow restriction 125a now being located more upstream than the corresponding component 25 in FIG. 4, it will be appreciated that the first component of the downstream flow restriction 125a is still 'downstream' of the most upstream feature or edge of the intermediate flow restriction 126. In this way, the intermediate flow restriction 126 still pre-conditions the vapour leakage flow before it impinges upon the most upstream of the downstream flow restrictions 125a, 125b at arrow 130.

Figure 6:
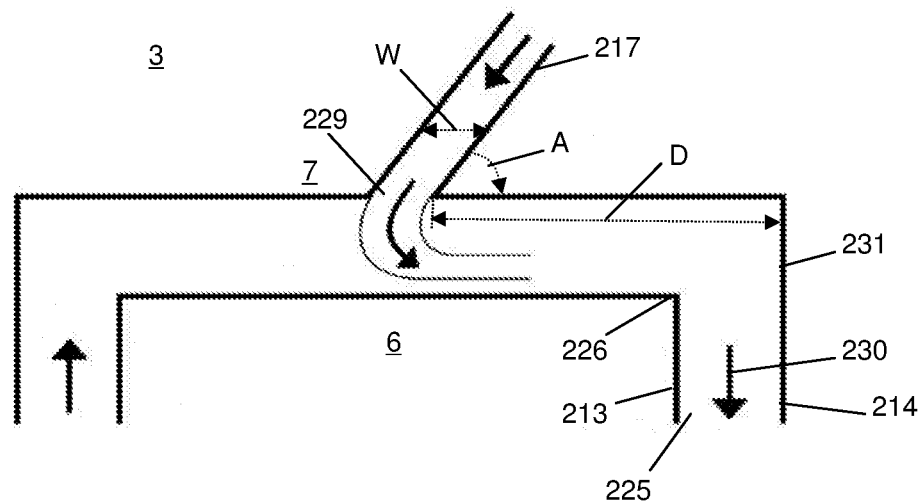
FIG. 6 is a schematic representation of a third embodiment of a sealing arrangement for an axial flow turbine incorporating a shrouded turbine wheel according to the present invention.

FIG. 6 illustrates a further embodiment of a sealing arrangement according to the present invention. The general form of the sealing arrangement shown in FIG. 6 is similar in some respects to the conventional fluidic jet seal described above with reference to FIG. 3, however, certain key parameters of the design of the fluidic jet seal shown in FIG. 6 have been optimised as a result of the realisation of the factors which influenced the design of the embodiments of the sealing arrangement described above in relation to FIGS. 4 and 5. That is, an appreciation for the first time of the importance of controlling the potentially negative influence of the kinetic energy of the fluid jet on the effectiveness of a seal incorporating an aerodynamic feature has enabled the development of a more effective fluidic jet seal.

In the sealing arrangement of FIG. 6, the layout of the shroud 6 and the wall 7 of the housing 3 again remain unchanged from earlier embodiments. Components similar to those illustrated in FIGS. 3 and 4 take the same reference numbers in FIG. 6 save for being increased by 200. A fundamental difference in the seal shown in FIG. 6 compared to the conventional fluidic jet seal shown in FIG. 3 is the optimisation of the axial displacement D of the downstream edge of the or each fluid jet orifice 229 from the radially extending wall 231 of the housing 3 that defines the downstream end of the radial clearance between the shroud 6 and the housing wall 7. Optimisation of the displacement D has taken account of three other seal parameters; the fluid jet pressure ratio PR (the ratio of the total pressure of the fluid supplying the jet relative to the rotor exit static pressure, to the total to static pressure drop across the rotor), the axial width W of the fluid jet conduit 217, and the angle of inclination A of the fluid jet conduit 217 to the turbine axis. The parameters D, A and W were optimised to achieve the best overall performance of the fluidic jet seal.

The vapour leakage flow entering the fluid leakage cavity is swirling strongly having just passed through the stator 4. It will be apparent that the swirl velocity must be greater than the rotational speed of the shroud 6 otherwise the turbine 1 would be operating below the zero work-line. The shear forces on the shroud 6 will act to decrease the swirl in the vapour leakage flow to approximately half the speed of the rotor 5 since the fluid leakage cavity has one rotating wall (the shroud 6) and one stationary wall (the wall 7 of the housing 3) of similar scales. In order to achieve this, the swirl kinetic energy that must be removed from the vapour leakage flow is transferred to mechanical energy in the rotor 5, through the shear forces acting on the rotating shroud 6. Thus, the vapour leakage flow contributes some positive energy into the rotor 5 via this mechanism, although the overall total effect of the vapour leakage flow must, of course, be to increase losses and reduce the output power of the rotor 5. The presence of a fluidic jet seal reduces or reverses the positive effect of the shroud seal forces. Firstly, the fluidic jet reduces the vapour leakage inlet flow and so less swirl momentum is carried into the vapour leakage path. Secondly, unless the fluidic jet itself is pre-swirled, the jet fluid enters the vapour leakage path with no swirl. The jet fluid therefore has to gain swirl momentum as it mixes with the vapour leakage flow, removing energy from the rotor 5. This latter effect can be minimised by positioning the fluid jet orifice(s) towards the downstream end of the radial clearance between the shroud 6 and the housing wall 7.

Detailed investigations into D, PR, W, A and the effect of shroud shear have concluded that it is advantageous to position the fluid jet orifice(s) 229 towards the downstream end of the radial clearance between the shroud 6 and the housing wall 7 but that the or each orifice 229 should not be so close to the corner 226 of the shroud 6 that the fluid jet flow fails to impinge on the shroud 6, and instead mixes with the vapour leakage flow exiting radially from the fluid leakage cavity, thereby significantly reducing the effectiveness of the seal. An understanding of the need to control the kinetic energy of the fluid jet has also influenced the design of the sealing arrangement shown in FIG. 6. As discussed above in relation to FIGS. 4 and 5, it is advantageous to disrupt the flow of the jet fluid as it turns to flow in the same direction as the main leakage flow along the leakage flow path. In the embodiment shown in FIG. 6, the disruption is provided by the downstream corner 226 of the shroud 6. That is, the axial displacement D has been selected to ensure that the fluid jet impinges on the corner 226 of the shroud as it turns to flow in the same general direction as the main leakage flow. The corner 226 of the shroud 6 is therefore functioning in a similar manner to the intermediate flow restrictions 26 and 126 discussed above in relation to FIGS. 4 and 5. Moreover, in the arrangement shown in FIG. 6, the tight axial clearance 225 defined between a radial surface 213 of the shroud 6 and a wall 214 of the housing 3 is analogous to the flow restrictions 25 and 125 present in the arrangements shown in FIGS. 4 and 5. Accordingly, by careful selection of D, taking into account the various other parameters mentioned above, what may appear to be a conventional fluidic jet sealing arrangement is actually a highly optimised sealing arrangement incorporating both the intermediate and downstream flow restrictions whose importance is discussed above in detail in relation to the embodiments shown in FIGS. 4 and 5.

EXAMPLES

Example 1

A series of CFD-based experiments were conducted to investigate the relationship between D, PR, W, A and shroud shear.

CFD Method Used to Design the Fluidic Seal

Figure 7A:
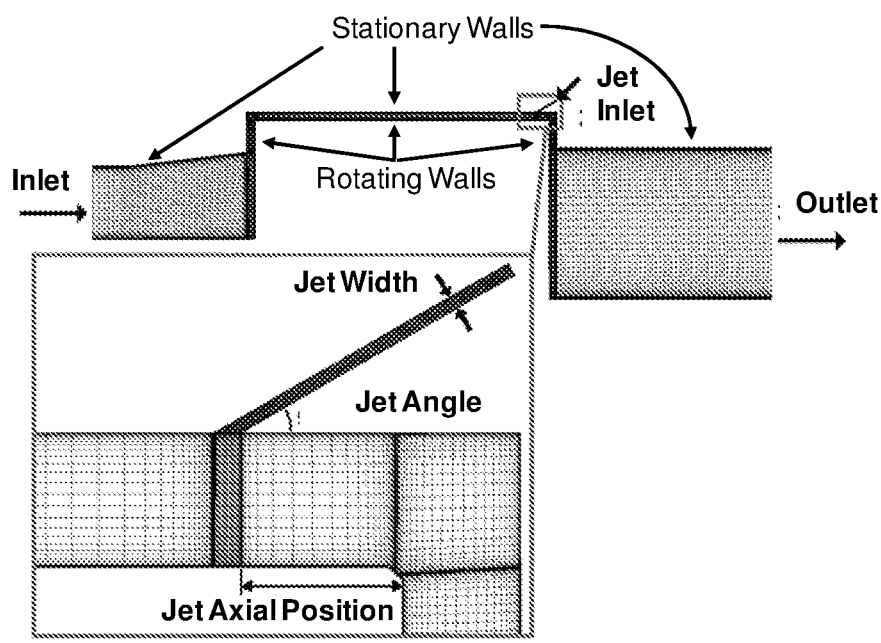
FIGS. 7a and 7b are respectively, a CFD Mesh, and a pair of contour plots of the flow for a typical fluidic seal CFD calculation.

FIG. 7a shows a typical 2-D axisymmetric CFD mesh used in the design calculations for a shrouded turbine geometry using the parameter values set out above in Table 1. The domain is the baseline geometry with a single inclined fluidic jet (continuous circumferential fluid sheet) applied through the casing wall. The jet is angled so that it enters the fluid leakage cavity with a component of its momentum opposing the leakage flow through the seal. In all of the CFD calculations, uniform values for total pressure and total temperature were applied at the turbine rotor inlet flow and jet inlet flow boundaries (the values used are given later in Table 2). The calculation domain was extended radially part way across the rotor flow in the direction of the turbine hub end-wall, in the rotor inlet and outlet regions. The flow through the rotor blades was not calculated (as illustrated in FIG. 7a). A zero axial gradient boundary condition was applied at the outlet from the calculation domain.

The CFD calculations were carried out using Ansys Fluent. All calculations used the SIMPLE pressure-correction solver and a high quality structured mesh consisting of 35,000 cells. Mesh dependency checks showed that this mesh density was sufficient to ensure mesh-independent results in these 2-D calculations. The k-E turbulence model was used throughout. The turbulence fields are dominated by the turbulence created in the region in and around the fluidic jet close to where it enters the fluid leakage cavity. Mean flow velocity gradients are much larger in this region than they are in any other area of the flow. The calculation results were therefore essentially insensitive to any sensible boundary condition values for k and E at the flow inlets.

Using Fluid Jets to Reduce Leakage Losses

Figure 7B:
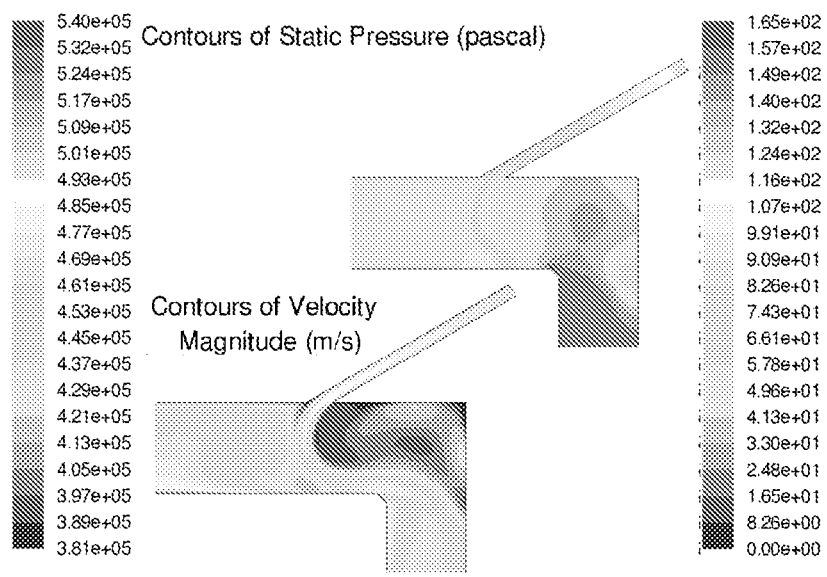

FIG. 7b shows contours of total pressure and absolute flow velocity from a typical fluidic jet seal CFD prediction, with the boundary conditions shown in Table 2 and a jet inlet total pressure of 5.0 bar. Only the section of the flow in the region of the calculation domain that has been blown-up in FIG. 7a is shown. The velocity contours illustrate how the fluidic jet is turned and mixes with the main leakage flow in the fluid leakage cavity, before exiting from the fluid leakage cavity. If the jet supply pressure is too high an 'over-blown' jet condition will exist, as described above, which has a negative impact on turbine performance and so it is desirable to design fluidic seals with jet conditions that allow some margin before the seal becomes over-blown.

TABLE 2

| Turbine Operating Parameters | |
| --- | --- |
| Rotor Inlet Total Pressure | 4.67 bar |
| Rotor Inlet Total Temperature | 412.7 K |
| Rotor Inlet Swirl Angle | 80 degrees |
| Rotor Outlet Static Pressure | 4.14 bar |
| Rotor Speed | 5236 rad/s |
| Rotor inlet turbulent k.e. | 5% of mean flow k.e. |
| Rotor inlet turbulent length scale | 0.096 mm |

The pressure contours shown in FIG. 7b illustrate how the fluid jet acts to reduce fluid leakage flow. The jet enters the fluid leakage cavity in a direction opposing the fluid leakage flow. A static pressure drop is needed to turn the jet flow to the same direction as the leakage flow as mixing occurs. This causes the sudden drop in static pressure across the fluid leakage cavity in the region where the jet flow enters the fluid leakage cavity shown in FIG. 7b. The presence of the jet acts to increase static pressure in the fluid leakage cavity upstream and to reduce it downstream of the point at which the jet flow enters, compared to the 'no-jet' condition. The higher pressure upstream of the fluidic jet reduces the pressure gradient in the inlet region of the fluid leakage cavity and therefore less fluid leakage flow enters through the inlet to the fluid leakage cavity from the main fluid flow to the rotor. For the geometry tested, the net overall leakage flow will be reduced, as compared to the 'no-jet' condition, so long as the fluidic jet seal is not over-blown. The fluidic jet seal also acts to reduce the pressure immediately downstream of the fluidic jet entry point. This reduces the pressure drop across the downstream axial restriction in the outlet region of the fluid leakage cavity, thereby reducing flow through the fluid leakage cavity outlet. Since the outlet flow is the sum of the inlet flow and the jet flow, the overall fluid leakage flow is reduced.

As discussed above, the effect of the presence of the fluidic jet on shroud shear, as well as fluid leakage mass flow, must be taken into account in assessing the overall turbine stage loss reduction from a fluidic seal. When a fluidic jet is added, two things happen that causes the positive effect of the shroud seal forces to be reduced or reversed. Firstly, the fluidic jet reduces the seal inlet flow and so less swirl momentum is carried into the fluid leakage cavity. Secondly, unless the fluidic jet itself is pre-swirled, the jet fluid enters the fluid leakage cavity with no swirl. The jet fluid therefore has to gain swirl momentum as it mixes with the fluid leakage flow and this will take energy out of the rotor. This latter effect can be minimized by positioning the jet close to the downstream end of the rotor shroud (as is the case in the geometry shown in FIGS. 7a and 7b). This is most likely to also have an advantageous effect on the mixing losses where the fluid leakage flow re-enters the main stage flow, because of the low swirl levels in the absolute rotor exit flow. The CFD calculations show that the shroud shear effect is important when assessing the performance benefit from fluidic seals.

Optimisation of the Fluidic Seal Design

Figure 8:
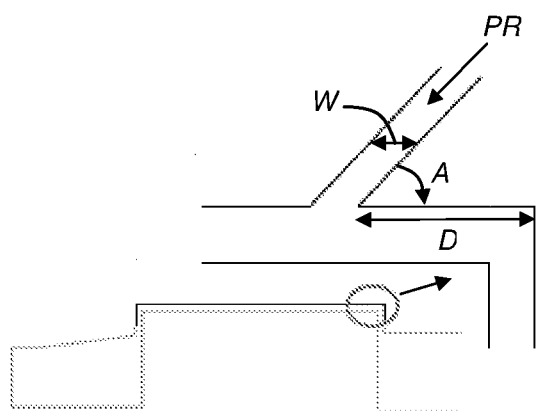
FIG. 8 is a schematic illustration of the fluidic seal design optimisation parameters.

The fluidic seal design was optimised by investigating the effect on turbine power output of the parametric changes shown in FIG. 8. The pressure ratio (PR) of the fluidic jet supply is defined according to equation 1.

$$PR = \frac{p_{02} - p_3}{p_{01} - p_3} \quad (1)$$

PR is the ratio of the total pressure of the fluid supplying the jet ($p_{02}$) relative to rotor exit static pressure ($p_3$), to the total to static pressure drop across the rotor ($p_{01}$-$p_3$). Optimisation calculations were carried out for values of PR starting from 1.0 and increasing in steps of 0.4 until the fluidic seal reached the over-blown state. The pressure drop driving leakage flow through the fluid leakage cavity inlet meant that a PR value of unity still resulted in some jet flow entering the fluid leakage cavity.

A) Leakage Mass Flow Reduction

Figure 9:
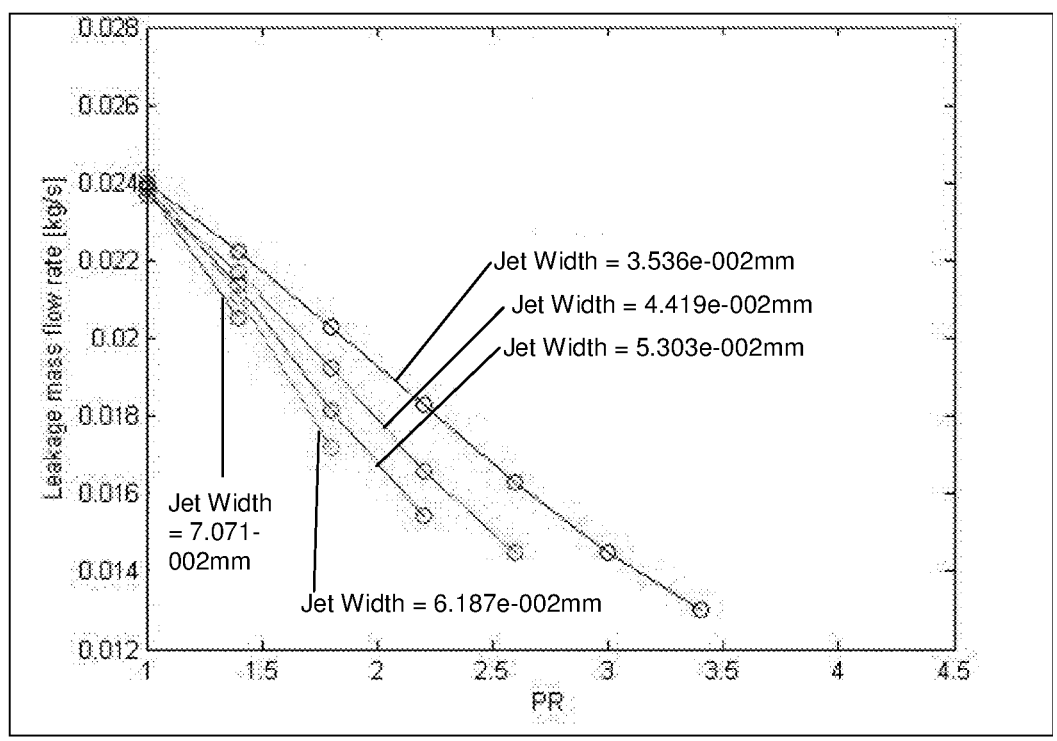
FIG. 9 is a graph of CFD leakage flow predictions for a fluidic jet with a predetermined configuration.

Seal leakage mass flow rate predictions for jet angle=45° and distance from corner=0.500 mm, are shown in FIG. 9, for all jet widths (W) and jet supply pressure ratios (PR) calculated. In each case, the maximum value of PR shown in FIG. 9 is the value just before the over-blown fluidic jet seal condition is reached. The leakage mass flow rate values in the figure are the sum of the leakage flow through the inlet into the fluid leakage cavity from upstream of the rotor, plus the mass flow of the fluidic jet. The results show that the narrower the fluidic jet, the greater the reduction in total fluid leakage flow, i.e. leakage into the fluid leakage cavity plus jet flow, that can be achieved; there is higher jet flow momentum for a given mass flow rate as the jet is narrowed. The figure also shows how narrowing the fluidic jet results in a higher jet pressure ratio being required in order to achieve a given reduction in leakage flow. It is also evident from the results that greater leakage flow reductions can be achieved with narrower jets before the over-blown seal condition is reached. For the narrowest jet examined (jet width=0.03536 mm), the results indicate that a reduction in total fluid leakage mass flow compared to the no-jet case of approaching 50% is possible for this jet angle and axial position.

Figure 10:
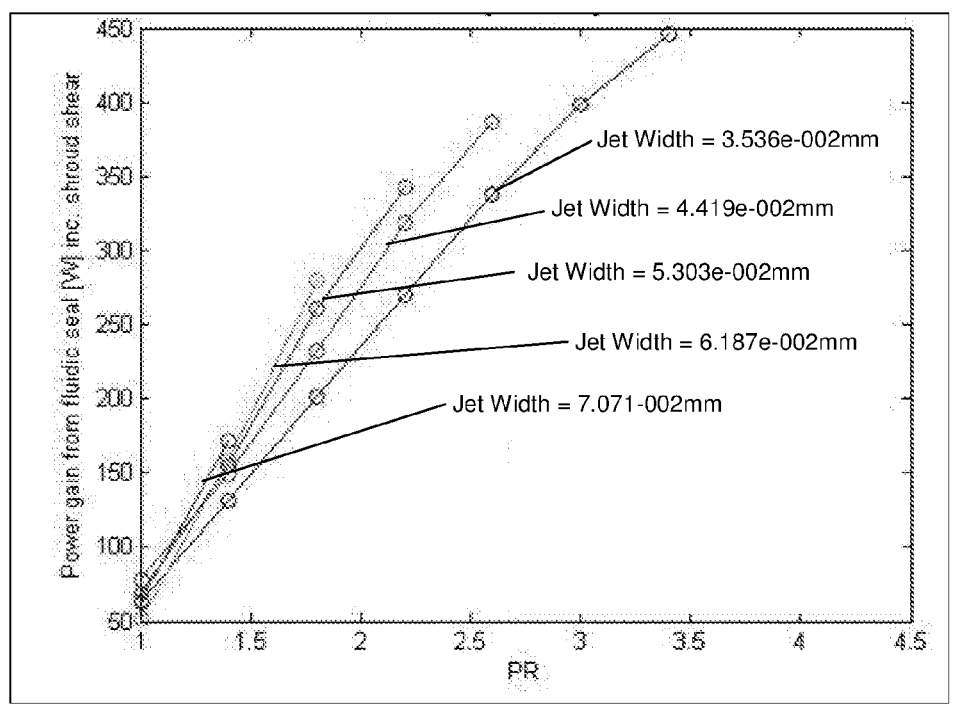
FIG. 10 is a graph of net power gain for a fluidic jet having the same configuration as that which provided the results presented in FIG. 9.

B) Overall Net Power Output Improvement Due to Reduced Leakage Flow and Taking into Account the Impact on Shroud Shear The impact on shroud shear is significant in quantifying the performance benefit from the improved sealing. FIG. 10 shows the total rotor power output improvement due to the fluidic seal, extracted from the same calculation data set used for FIG. 9.

The power gains shown in FIG. 10 are calculated assuming that a 1% reduction in turbine stage flow leaking through the fluid leakage cavity, will yield a 1% improvement in turbine stage power, minus the power reduction due to shroud shear force effects described previously. FIG. 10 shows that the conditions that produce the largest leakage mass flow reductions in FIG. 9, result in a net increase in rotor power of around 450 W.

Figure 11:
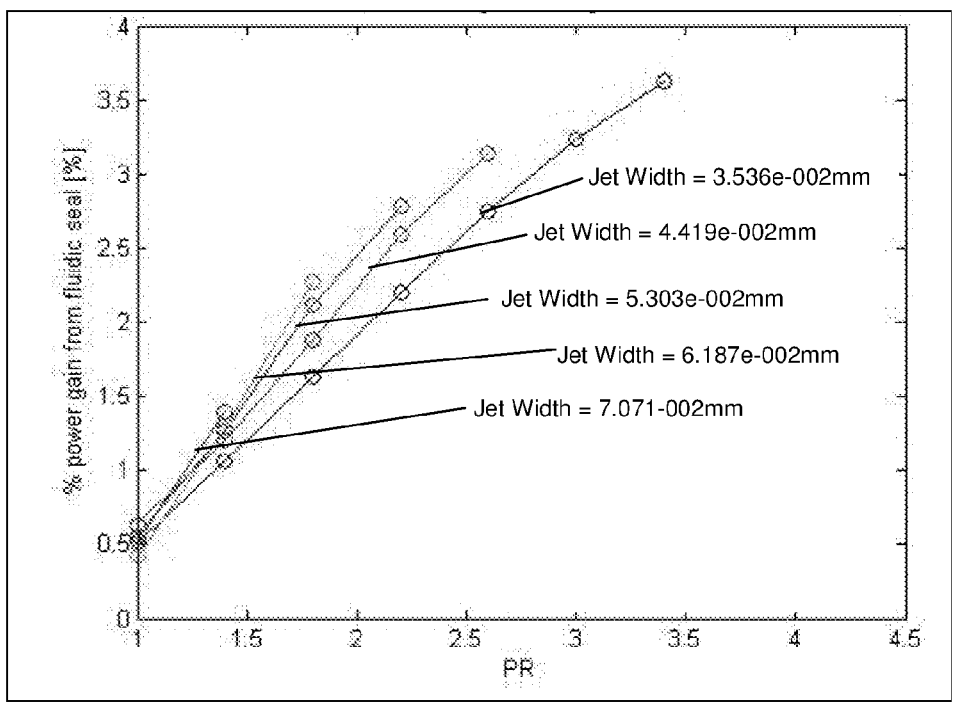
FIG. 11 is a graph of net power gain from the fluidic seal as a percentage of turbine power for a fluidic jet having the same configuration as that which provided the results presented in FIG. 9.

The data shown in FIG. 10 is plotted as a percentage of total turbine stage power in FIG. 11. This shows that the net power gain of 450 W translates to an improvement in output power of approximately 3.5% for the turbine incorporating a fluidic jet sealing arrangement according to an embodiment of the present invention.

All of the CFD calculations described so far were for a jet angle, A, of 45° and distance from corner, D, of 0.500 mm. Calculations were carried out for other values of these parameters during the optimization of the seal design, as indicated below in Table 4.

TABLE 4

Fluidic Seal Design Parameters Tested

| Width, W (mm) | 0.03536 | 0.04419 | 0.05303 | 0.06187 | 0.07071 |
|---|---|---|---|---|---|
| Angle, A (°) | 30 | 45 | 60 | | |
| Distance, D (mm) | 0.21 | 0.355 | 0.500 | | |

Figure 12:
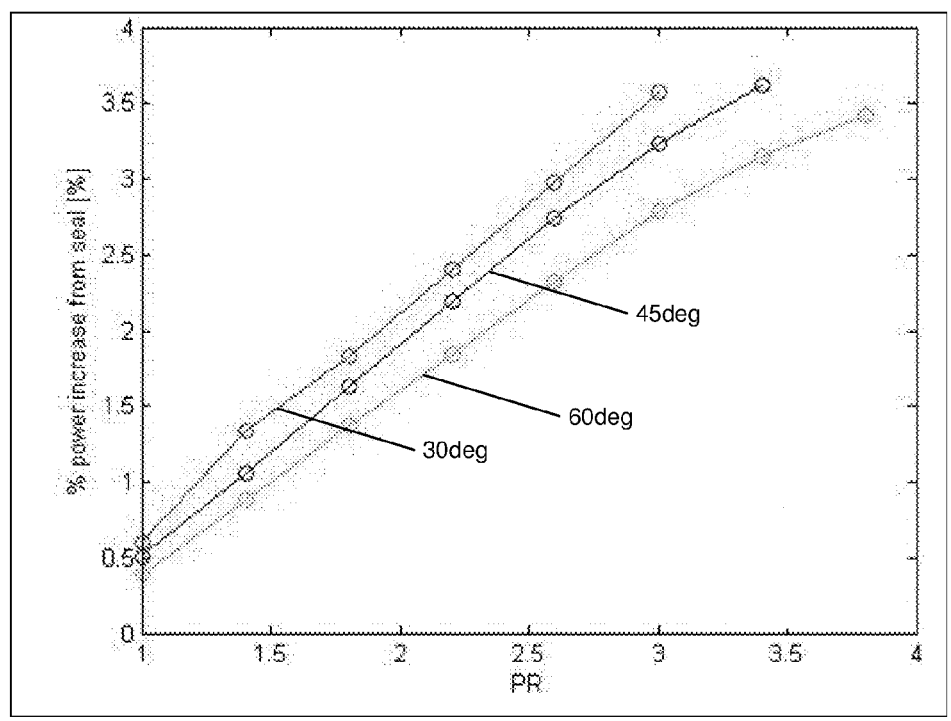
FIG. 12 is a graph of the effect of jet angle, A, on power output for a fluidic jet of narrower width, W, than that which was employed to obtain the results presented in FIG. 9.

The effect of the jet angle, A, on turbine stage power output is shown in FIG. 12 for the narrowest jet width calculated (0.03536 mm) positioned 0.500 mm from the corner of the shroud cavity. Results are shown for the three values of jet angle from the axial direction, listed in FIG. 8. As the angle reduces, the proportion of jet momentum directed against the fluid leakage flow increases. This increases the effectiveness of the jet in creating blockage, reducing leakage mass flow rate and consequently increasing turbine power output. In general, for any given jet pressure ratio, the improvement in power output from decreasing the jet angle from 60° to 45° is greater than that for the change from 45° to 30°. The results indicate diminishing returns for the benefits to be gained by designing seals with low jet angles, which are also likely to present greater manufacturing challenges. The fluidic seal becomes over-blown at lower values of PR as the jet angle reduces. The data in FIG. 12 shows that it is possible to achieve turbine power outputs improvements of 3.5% with both 30° and 45° jet angles. So, moving to the lower jet angle does not improve the absolute performance benefit, it allows that improvement to be achieved at lower jet supply pressures. In the present model of a turbine expander, the fluid supplying the jet is extracted from upstream of the turbine stage and throttled down to the desired jet supply pressure. So, the maximum jet supply pressure (p02) that is available in the current system is the turbine stage inlet pressure, i.e. no throttling of the flow supplying the jet. Under these conditions, PR, as defined by equation 1, becomes approximately equal to the reciprocal of the turbine stage reaction. The turbine is a low reaction impulse design and so it is possible to achieve values for PR that are several times greater than the maximum value of PR=5.5 shown on the horizontal axis in FIGS. 9-13. The principal seal operating constraint for this system is the jet supply pressure at which the seal becomes over-blown, rather than the value of PR required for optimum fluid leakage reduction. For these reasons, a jet angle of 45° was selected as the optimum angle for the present embodiment. This means that a slightly higher value of PR will be needed to achieve best overall leakage reduction, compared to that for a lower angled jet with a greater counter-leakage flow velocity component.

Figure 13:
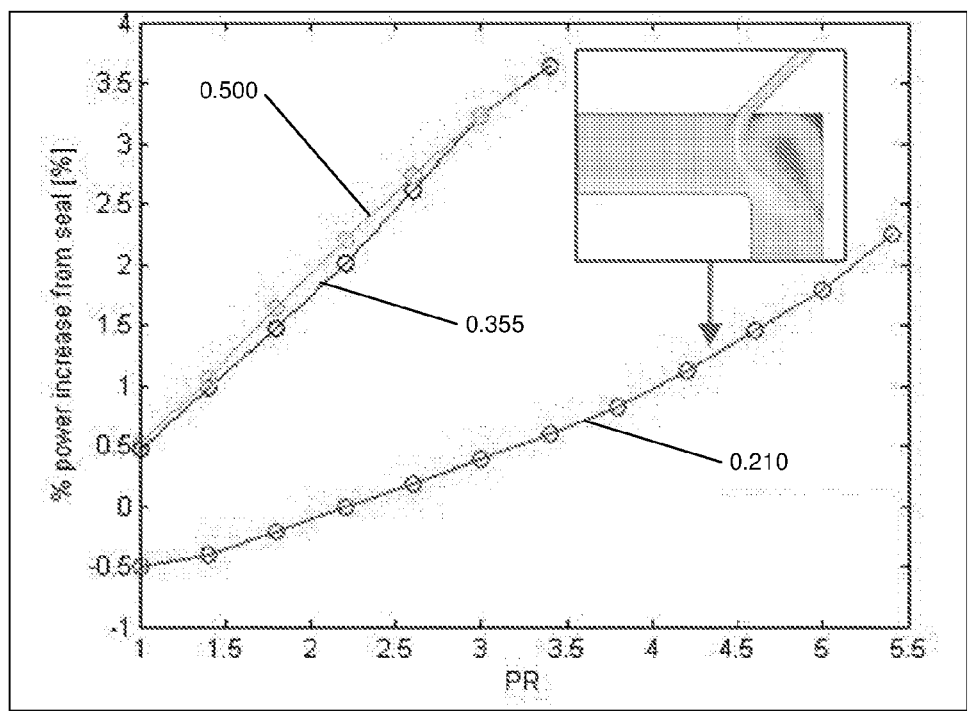
FIG. 13 is a graph of the effect of distance from corner, D, on power output for a fluidic jet with the same configuration as that which provided the results presented in FIG. 12.

FIG. 13 shows the influence of varying the axial distance of the jet entry point to the downstream corner of the shroud seal cavity (see FIG. 8). The results shown in FIG. 13 are all calculated for the narrowest jet width considered in the study (W=0.03536 mm) and a jet angle, A, of 45°. Three jet positions are compared in FIG. 13. The variation of output power increase with pressure ratio (PR) is similar for the cases where the jet is positioned 0.355 mm and 0.5 mm axial distance, D, from the corner. Quite different results can be seen when the jet is positioned closer to the corner (D=0.210 mm). The performance improvement from the fluidic seal is much reduced in this latter case. At low values of PR the fluidic seal has a negative impact on performance compared to the no-jet case. At higher values of PR there is a net benefit from the fluidic seal, but much higher values of PR are required to achieve performance gains compared to the other jet axial positions. Also, the maximum achievable performance gain is significantly lower with the seal in the closest position to the corner compared to what is possible at the other jet locations. The CFD results revealed the principal difference between the flow structure in the D=0.210 mm case and the other cases. The predictions showed that if the jet is positioned too close to the end of the shroud, the deflection of the fluidic jet in the fluid leakage flow is such that the jet flow does not impinge on the shroud, and instead mixes with the fluid leakage flow exiting radially from the fluid leakage cavity. An example of this flow regime is shown in the velocity contour plot inserted into FIG. 13. It is important that the fluidic jet impinges onto the surface of the shroud in order for the jet to create maximum blockage and to achieve the best performance gains. As long as this is achieved, the performance gains are similar, as shown by the 0.355 mm and 0.5 mm axial distance results in FIG. 13. It is desirable to position the fluidic jet axially closer to the outlet of the fluid leakage cavity than the inlet in order to minimize the work done by the shroud shear forces in accelerating the swirl velocity component of the jet fluid. There will be some variation in relative axial positioning between the rotor and the casing due to manufacturing and assembly tolerances and during operation. This needs to be taken into account when designing the seal. For these reasons, the axial position of 0.500 mm from the corner of the shroud seal cavity was selected as the optimum for the current embodiment.

In summary, the optimization process has resulted in the selection of the seal parameters shown in Table 5 for the fluidic seal design being developed in this study.

TABLE 5

Optimised Fluidic Seal Design Parameters

| | |
|---|---|
| Jet Width | 0.03536 mm |
| Jet Angle | 45° |
| Jet Axial Distance from Corner | 0.500 mm |

The jet is supplied with fluid bled from upstream of the turbine stage and throttled to a supply pressure ratio PR=3.0. This will allow some margin before the seal becomes over-blown. Under these conditions, the CFD simulations indicate that the optimised fluidic seal will improve the output power from the turbine by just over 3%.

Conclusions

The design of a fluidic jet aerodynamic seal for an application as a turbine rotor tip seal on a small, high-speed, single stage axial flow turbine has been described. The results of a CFD-based investigation show that it may be advantageous to make the jet width as narrow as possible within manufacturing constraints, that the performance gains yield diminishing returns as the jet angle becomes increasingly acute, 45° being a good compromise, and that it is advantageous to position the jet axially towards the downstream end of the fluid leakage cavity, but not so close that the deflected jet fails to impinge on the rotor shroud. The CFD calculations have also shown that the effect of shroud shear forces is significant and should be taken into account when evaluating the net performance gain from the sealing.

Example 2

A. Experimental Setup

Figure 14:
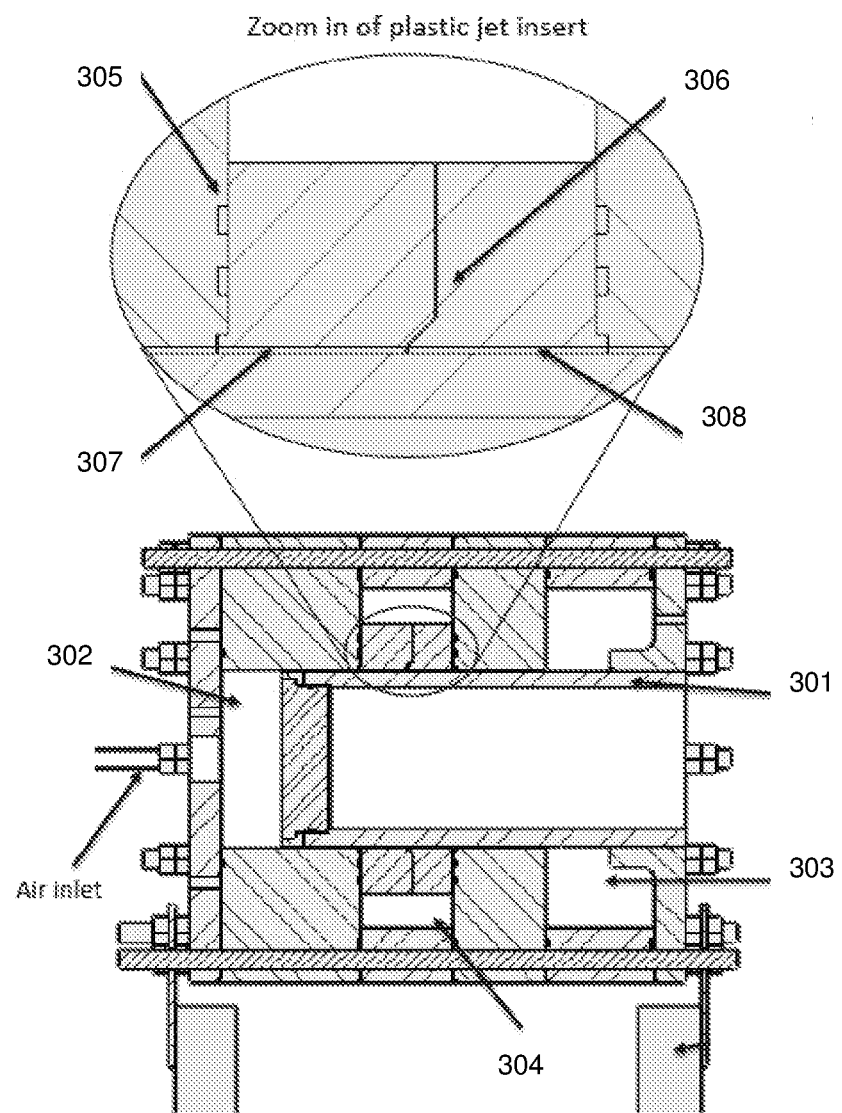
FIG. 14 is cross-sectional drawing of the test facility used in Example 2 below.

A cross-sectional drawing of the test facility is shown in FIG. 14. The test rig was made from a series of mild steel concentric rings, held together around their perimeter by 12 threaded bars and sealed with O rings. A central tube 301 modelled the rotor shroud with a small radial clearance between it and the housing. Pressure chambers are located at the inlet 302, outlet 303 and jet 304 with pressure tapings allowing for pressure measurement via a scanni-valve. In FIG. 14 a detailed view of the initial jet and insert set-up are given showing the side seal O rings 305, fluidic jet inlet 306, leakage channel inlet 307 and straight downstream leakage channel geometry 308. The rig was then attached to a blow-down facility via a series of pipes, with orifice plates to measure mass-flow out of the tank and the jet mass-flow.

B. Testing Procedure

The same test conditions were used in both CFD and experimental tests. Unless stated otherwise later, experiments were run with an inlet pressure of 3.5 bar, and an outlet of 3 bar (absolute pressures). The experiments started with the jet turned off to measure the leakage mass-flow of the geometry in the absence of any fluidic jet; to act as a benchmark against which to measure leakage changes. The jet was then turned on, to the same pressure as the inlet, and the pressure then gradually increased, with the orifice plate pressures and rig pressures being recorded at several stages during the experiment. The jet pressure was increased until the experiment became overblown. ("Overblown" is a condition when jet mass-flow starts to exit through the inlet, this is an undesirable condition and sets the upper limit of jet pressure). The orifice plate pressures were then used with a Matlab™ script to calculate mass-flows.

C. Computational Fluid Dynamics (CFD)

Figure 15:
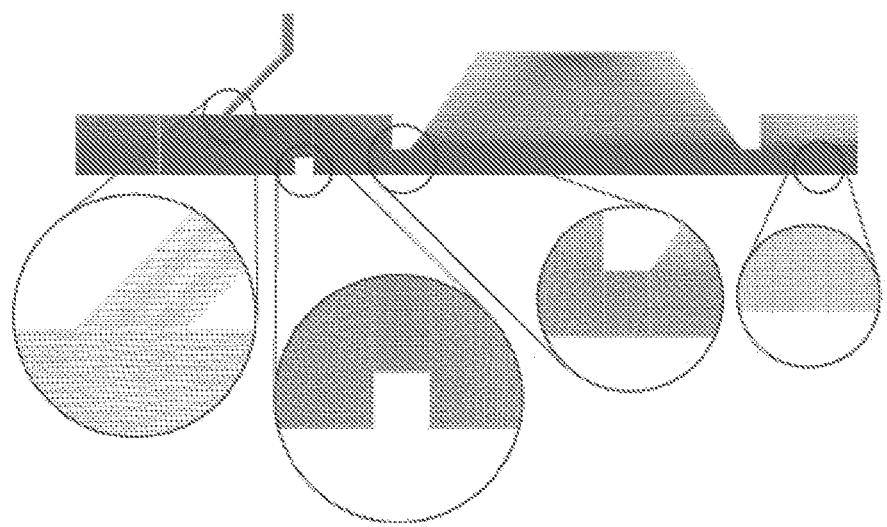
FIG. 15 is an imagine showing details of the mesh used for CFD simulations in Example 2 below.

CFD simulations were used to validate the experimental results. They were also used to predict the effect of changes to the geometry so that optimal tests could be designed. Meshes used were generated to model the experimental rig using Pointwise™ V17, and solved using Fluent™ 14.0. In the most part, 2D structured meshes of quadrilateral elements were used (a few unstructured tetrahedral meshes were used to model more complex, curved geometries). They were solved using a scaled axisymmetric method, with air as an ideal gas and using the k-ε turbulence model. A simple $2^{nd}$ order solution method was used throughout. An example of the mesh is shown below in FIG. 15 and has 132621 quadrilateral cells.

D. Initial Testing

Figure 16:
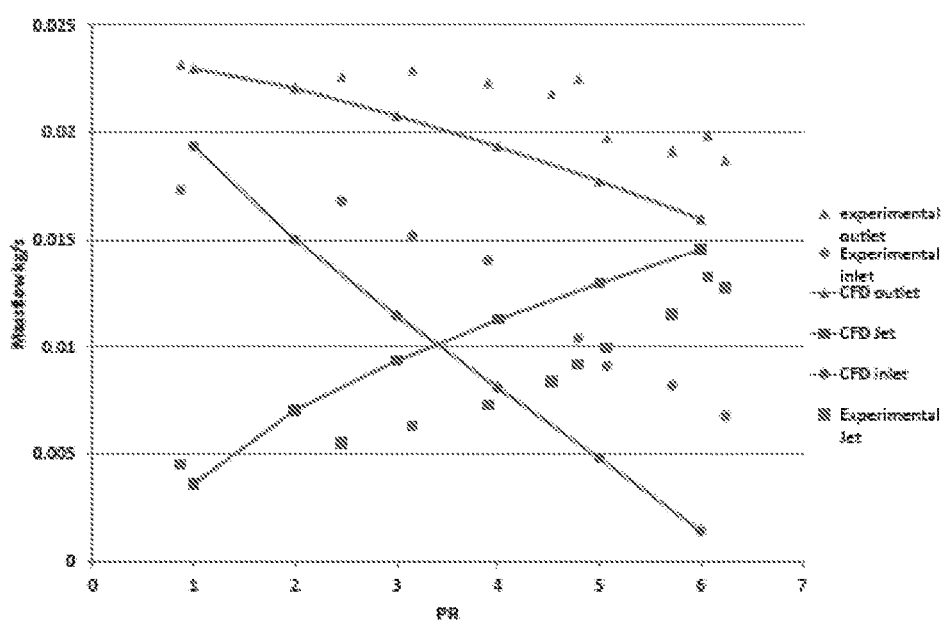
FIG. 16 is a graph showing the effect of pressure ratio (PR) against mass-flow of the inlet, jet and outlet. CFD and experimental results are included.

Initially the set-up described in Appendix C was used as shown in FIG. 14. After some initial leaks had been cured, the test in Appendix D was repeated with a simple jet and no labyrinth restriction. The results are shown below in FIG. 16. The results plotted in FIG. 16 show mass-flow for the inlet, outlet and jet, against pressure ratio (PR); equation 1 below. PR is a key dimensionless parameter used to describe the operating condition of the fluidic jet. It is the ratio of: the difference between the jet and outlet pressures, against the pressure across the leakage channel (inlet minus outlet pressure). FIG. 16 shows that at the start of the experiment, PR=1, the jet mass-flow is very small, so all the leakage is coming from the inlet flow. As expected, increasing the pressure in the jet results in a corresponding decrease in inlet mass-flow, proving that the jet is blocking the inlet flow. This is because increased jet mass-flow creates a pressure drop in the channel resulting in reduced inlet mass flow.

Furthermore, this lead to a net reduction in leakage mass-flow (outlet mass-flow (the sum of the inlet and jet mass-flows) dropped by 12% over the experiment). This test therefore represents the first experimental verification of fluidic jets reducing net overall leakage flow. However, the results obtained did not seem to agree with the CFD results. This was traced to the plastic insert defining the fluid jet conduit (shown in the detail section of FIG. 14) deforming under pressure and assembly. It was expected that greater mass-flow reductions would be achieved once the rig was fixed. The data shown here have been normalised by pressure (using equations 1, 2 and 3 below) to account for the pressure variation during the experiment. Equation 2 was used on the inlet, outlet and jet mass-flows and multiples the recorded mass-flow by the ratio of ideal pressure to the experimental value, hence accounting for pressure variation during the experiment. The ideal value for the inlet and outlet are the pressures set out in section B above. The ideal jet pressure was calculated so as to keep PR the same using equation 3, which was derived from equation 1.

$$PR = \frac{p_j - p_o}{p_i - p_o} \quad (1)$$

$$\dot{m}_{norm} = \dot{m} \frac{p_{ideal}}{p_{actual}} \quad (2)$$

$$p_{Jet\text{-}ideal} = PR \frac{\Delta p}{p_o} \quad (3)$$

E. Modified Experimental Rig

Figure 17:
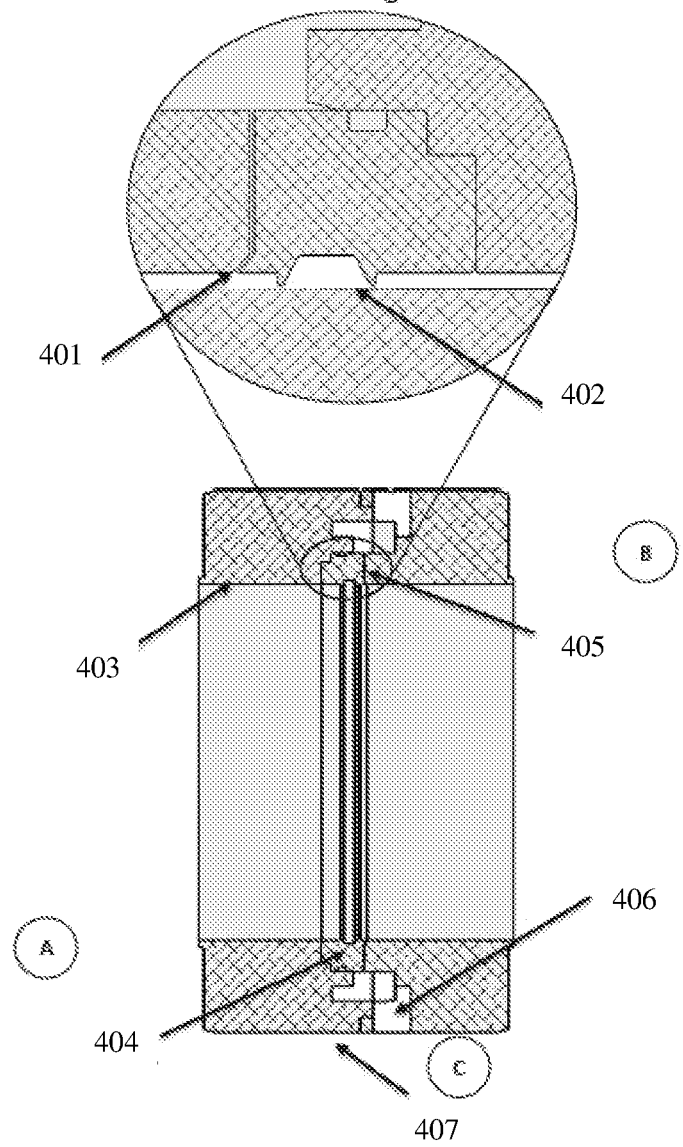
FIG. 17 is a drawing showing a section view of the insert used in the test rig, with a detailed view showing the new insert design and jet geometry.

To stop the inlet deforming under changing pressure and hence resolve the aforementioned problem, a new aluminium insert was designed (as shown in FIG. 17). With reference to FIG. 17, the new insert defined a fluidic jet entry point 401 and a downstream labyrinth restriction 402 before the outlet to the leakage path. As shown in FIG. 17, the insert defines a leakage channel inlet 403, a changeable metal disc to control jet and downstream geometry 404, a pair of faces 405 where the jet thickness can be changed by adding shims to move the changeable metal disc 404, a jet pressure chamber 406 and a bottom surface 407 for sealing against O rings arranged so as not to close the jet. A new axillary test rig was also designed and made, to ensure that the new insert did not deform as before and to enable measurement of the jet thickness in situ. (Details given in appendix B below). Several changes were also made to the rig at this time to help reduce weight and aid assembly. These changes are detailed in appendix A below. The new metal insert has several advantages over the old insert, which are labelled A to C below to match with the features A to C labelled in FIG. 17:

A: the test geometry is changeable by altering the metal disk allowing for a range of jet designs to be easily tested;

B: the jet thickness can also easily be changed by the addition of shims behind the for-mentioned disk, without blocking the jet channel; and C: the insert is designed to seal on the top and bottom as opposed to the sides as before; this means during assembly tightening of the rig no-longer can crush the insert, as there is spare room at the sides, hence the jet thickness is kept constant.

The piping, air supply, apparatus and mass-flow measurement are all the same as detailed in Example 2 and in Appendix C and D.

F. Geometry Verification and Measurement

Once manufactured and assembled it was found that some of the clearances were different to the design values, due to manufacturing tolerances and assembly alignment. To verify the exact geometry a series of chocked flow tests at various pressures were run. The flow chocked at the smallest area and using equation 4 (from the isentropic flow tables) below, it was possible to work out the chocked area (just after the labyrinth restriction) and hence using equation 5 below (which is simply derived from the geometry of the rig) the chocked clearance. The chocked area/clearance will be smaller than the physical area due to the vena-contracta effect. Therefore to calculate the actual physical area of the labyrinth restriction, CFD simulations were run at the same pressures, while varying the labyrinth clearance until the mass-flow agreed with the experimental data. These processes calculated the exact geometry of the rig and the values are given in the geometries tables (6, 7 and 8), in the results sections.

$$A = \frac{\dot{m}\sqrt{C_p T_o}}{F(M) P_o} \quad (4)$$

$$C = 1/2 \left( \sqrt{\frac{A + \pi\left(\frac{0.1143}{2}\right)^2}{2\pi}} - 0.1143 \right) \quad (5)$$

G. Geometry Tested

The geometry tested was a continuous inclined jet at 45°, with two downstream labyrinth restrictions shown in FIG. 19. This figure is diagrammatic of the geometry used and is not to scale. Some dimensions were fixed throughout testing and these are given in the figure; other dimensions were variable, such as jet thickness and labyrinth clearance, to optimise the design. The geometry was further varied by the addition of a block on the rotor (dimensions C and D in FIG. 19), which is later referred to as the kinetic energy or flow blocker. Their values are given in the following sections with reference to the labels in FIG. 19.

Results and Discussion

A. Inclined Jet with Narrow Downstream Labyrinth Restriction

TABLE 6

Table of dimensions for fluidic jet with narrow downstream labyrinth restriction

| Label in FIG. 19 | Name | Intended Dimension (mm) | Chock test Dimension (mm) |
|---|---|---|---|
| A | Horizontal jet thickness | 0.2 | 0.17 |
| B | Jet thickness | 0.1414 | 0.12019 |
| C | Distance from jet entry to downstream blocker | none | n/a |
| D | Size of the square blocker used | none | n/a |
| E | 1st Labyrinth restriction | 0.1 | 0.07 |
| F | 2nd Labyrinth restriction | 0.1 | 0.07 |

The first geometry tested is detailed in table 6. CFD and experimental tests were run with an inlet pressure of 6 bar and an outlet pressure of 4 bar (absolute pressures). High values were chosen to ensure the labyrinth restrictions did not become chocked during the experiment. A large pressure drop was also chosen so that the small changes in pressure ratio could be achieved with the manual valves. The results are shown in FIG. 18 below and have been normalised by pressure as before. There was very good agreement between CFD and experimental results which validated the tests. The experiment worked well, the jet mass-flow increasing with PR and blocking the inlet flow. There were, however, two issues identified with the results. The first was that no improvement in leakage mass-flow was found, and secondly, that it became overblown at a pressure ratio of just 1.15. The reason that no net benefit was found can be seen in FIG. 20. FIG. 20 shows the velocity and pressure distributions from the CFD calculations, and shows the jet moved all the flow to the bottom of the channel and hence the kinetic energy of the jet passed through the labyrinth restrictions reducing their effect. This combined with the fact that the jet pressure was low, and hence easily turned, meant that it did not cause a large enough pressure drop to counter the negative effects of kinetic energy carry-over. The reason for the jet becoming overblown at a low pressure ratio was because the labyrinth restrictions were too narrow. This meant that in the 1 mm thick channel the flow had a very low velocity and hence a low momentum to turn the high momentum jet flow, therefore it became overblown easily. CFD simulations were carried out to find the optimum labyrinth clearance where the jet would turn at a higher pressure ratio, but could also be tested using the pressures available in the blow down tank. The jet thickness to labyrinth clearance ratio should preferably be small for the jet to work effectively.

B. Inclined Jet with Wider Downstream Labyrinth Restriction

A 0.5 mm restriction was chosen and the metal disk (part A in FIG. 17) was re-machined to this clearance. The chocked tests were then repeated to calculate the exact geometry; values are given above in table 7. Here the same CFD and experimental tests were repeated as in section IV-A.

TABLE 7

Table of dimensions for fluidic jet with wider downstream labyrinth restriction

| Label in FIG. 19 | Name | Intended Dimension (mm) | Chock test Dimension (mm) |
|---|---|---|---|
| A | Horizontal jet thickness | 0.2 | 0.175 |
| B | Jet thickness | 0.1414 | 0.1238 |
| C | Distance from jet entry to downstream blocker | none | n/a |
| D | Size of the square blocker used | none | n/a |
| E | 1st Labyrinth restriction | 0.5 | 0.42 |
| F | 2nd Labyrinth restriction | 0.5 | 0.42 |

The results are presented below in FIG. 21 and have again been normalised by pressure; a good correlation between experimental and CFD results were found. The fluidic jet became overblown at a much higher pressure ratio of 5.8. This meant that a much higher pressure jet was injected into the channel and, hence, more inlet momentum was used to turn this flow leading to a much larger pressure drop across the jet. Here a net reduction in leakage mass-flow of 8% was achieved before the seal became overblown, showing that the changes had given rise to improved performance. However, the effect of kinetic energy from the jet carrying through the labyrinth restriction was still present and reduced the leakage mass-flow drop achieved. This effect can be seen in both FIGS. 21 and 22. At a PR of 3, the velocity plot shows that the jet has moved the flow, and hence the kinetic energy to below the labyrinth restriction; this has reduced its effect but it has not yet fully crossed the leakage path and therefore does not cause much of a pressure drop. The result is that the leakage massflow is made worse, as shown in the results. It is not until higher pressure ratios that the jet creates a large enough pressure drop to give a net benefit. This proves that using a smaller jet to labyrinth clearance ratio gives a net reduction in mass-flow.

TABLE 8

Table of dimensions for fluidic jet

| Label in FIG. 19 | Name | Intended Dimension (mm) | Chock test Dimension (mm) |
|---|---|---|---|
| A | Horizontal jet thickness | 0.2 | 0.175 |
| B | Jet thickness | 0.1414 | 0.1238 |
| C | Distance from jet entry to downstream blocker | 0.3 | n/a |
| D | Size of the square blocker used | 0.3 | n/a |
| E | 1st Labyrinth restriction | 0.5 | 0.47 |
| F | 2nd Labyrinth restriction | 0.5 | 0.47 |

The CFD calculations presented in FIG. 22 clearly show the effect of kinetic energy from the jet passing through the labyrinth restriction. To improve the mass-flow reduction, the kinetic energy carry-over needed to be isolated from the downstream restrictions. Experimental tests were carried out with a flow blocker placed between the jet and the first labyrinth restriction, as shown in FIG. 19, to try and prove this theory. CFD simulations were run to find the optimum distance, C, downstream of the jet, and a distance of C=1 mm was found to be best. A 0.25 mm thick wire was attached to the rotor using 0.05 mm thick metal tape, and tests were repeated as before. A 0.3 mm high blocker was decided upon so as to be large enough to move the kinetic energy from under the labyrinth restriction without the blocker becoming too much of a restriction to the flow itself. A new mesh was created with a flow blocker and the CFD simulations were run.

The CFD tests and experimental results showed a 37% reduction in mass-flow at a pressure ratio of 3.5; there was a good agreement between the results as is shown in FIG. 24. This is a good result as experimental tests have shown a significant reduction in net leakage mass-flow and hence the use of fluidic seals as an effective sealing technology has been validated. Furthermore, this experiment validates the idea that a fluidic jet reduces the pressure drop across a downstream aerodynamic restriction and hence further reduces the leakage mass-flow. The addition of the blocker therefore increased the leakage drop by 5 times more than the 'no blocker' case; it also reduced the pressure needed to achieve this drop.

CFD simulations were also run with an idealised 0.3 mm square blocker rather than a circular wire blocker as used in the tests and earlier CFD study. Although the same size blocker was used, the shape meant that the jet flow was deflected more and hence even more kinetic energy was removed. The CFD predicted a 48% drop in leakage mass-flow compared to the labyrinth restriction alone, at a pressure ratio of 3.55. This simple geometrical change therefore gives the potential for an even greater reduction in mass-flow. The velocity and pressure distributions from the CFD calculations of the actual and idealised geometries are very similar. The effects are better shown in the ideal (square blocker) case, it is for these reasons that this case has therefore been included in FIG. 23.

FIG. 23 shows velocity and pressure distributions from the CFD calculations which show insight into why the new geometry is more effective than the previous geometry. The main reason is that the negative aerodynamic effects of the jet, in this case kinetic energy carry-over, are isolated from the labyrinth restrictions. The jet is initially turned across the full width of the channel which causes a large pressure drop (as shown in the pressure plot in FIG. 23). Then to get around the blocker the jet is forced to turn upwards again and then is turned a third time to flow under the labyrinth restriction. This stops the kinetic energy of the jet from going under the labyrinth restriction. The additional turning of the jet creates more pressure drop, as can be seen by the in the pressure plot at PR=3.55. This dramatically reduces the pressure drop across the downstream labyrinth restrictions causing leakage mass-flow to be reduced. This can be compared to the PR=1 case where the leakage flow easily passes the blocker and all the pressure drop is across the labyrinth restriction. This result can also be compared to FIG. 22 where not only is the pressure drop caused by the jet smaller, but all the kinetic energy passes under the downstream restrictions.

The pressure ratio at which the best sealing was achieved was 3.55; this is also 36% lower than when no blocker was used. This is because the inlet flow has to force the jet flow to turn further in order for it to go over the blocker. Turning the flow further means there is a larger pressure drop per kg of jet mass-flow. Therefore to seal the leakage channel a smaller jet mass-flow is required and hence a lower pressure ratio. This is a very useful characteristic of the design as this makes the fluidic seal easier to incorporate into a real turbine. The addition of the blocker makes the fluidic sealing far more effective for both these reasons.

Conclusions

The CFD calculations and the experimental results showed a good agreement, validating the results obtained. The CFD calculations also gave details into how the velocities and pressures changed with the introduction of the jet into different geometries.

Using a fluidic-labyrinth seal a 37% reduction in leakage mass-flow, compared to the no jet case, was shown experimentally and validated by CFD calculations. Further, CFD calculations on an idealised geometry showed that an increased reduction of 48% against the 'no jet' case, was possible. Both these mass-flow reductions occurred at a pressure ratio of 3.55. Experimental tests have shown a significant reduction in net leakage mass-flow and hence the use of fluidic seals as an effective sealing technology has been validated. Furthermore this experiment validates the idea that a fluidic jet reduces the pressure drop across a downstream aerodynamic restriction and, hence, further reduces the leakage mass-flow.

The results also highlighted the importance of stopping the kinetic energy of the jet carrying over into the labyrinth seal. Tests without a kinetic energy blocker upstream of the labyrinth seal only showed an 8% reduction in net mass-flow. Another important result shown was that the jet should preferably be much thinner than the labyrinth restriction so that there is much more momentum in the leakage channel than in the jet flow, and therefore higher pressure jets, which are more effective, can be used.

APPENDIX A-TEST RIG DESIGN

This section gives more details into the new test rig used to conduct the experiments. A cut through of the rig is shown in FIG. 25, with the bolts and stand removed for clarity. The concentric steel rings were re-machined to allow for the new insert, as well as the addition of new larger O rings, all on the same side, to aid assembly. The rig was also reduced in size slightly so as to reduce its weight. FIG. 25 shows the new 3-part insert 501, the position 502 at which the jet is blown into the leakage channel, the inlet air supply 503, the jet chamber 504, the air outlet 505 and the stationary rotor 506.

APPENDIX B-INSERT AUXILIARY TEST RIG

Once the new insert was manufactured, to ensure that the problems associated with the old insert were fixed, an auxiliary test rig was designed and made. This is because once the insert is assembled with the main rig, it cannot be accessed, therefore the jet thickness is unknown. The auxiliary insert was designed to seal with the same O rings as the main rig and just provided the jet pressure chamber. In this way, the jet could be pressurised and the jet thickness could be measured all the way round with a feeler gauge, in operational conditions. Weights could also be applied to the faces of the insert to represent the inlet and outlet pressures in the rig. The testing showed that the jet was continuous and did not change as pressures changed, hence the problems with the old jet had been solved. The feeler gauge also confirmed the CFD jet thickness results. A solidworks model showing the design of the rig is shown below in FIG. 26. Shown in FIG. 26 are two O rings 601 to seal the rig (the same set-up as in the main test rig), the open ends 602 to the rig to provide access to the fluidic jet, the point 603 at which 'shop air' was introduced to pressurise the assembly during testing and an image 604 showing how the insert fits into the test rig.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

APPENDIX C-RIG SET UP

Initially the set up described below and shown in Table 9 was used as shown in FIG. 14.

TABLE 9

| Key specifications for the rig | |
|---|---|
| Max. jet pressure [barg] | 12.0 |
| Max. inlet pressure [barg] | 12.0 |
| Nominal leakage channel height [mm] | 1.0 |
| Nominal leakage channel area [m$^2$] | 3:58 × 10$^{-4}$ |
| Leakage channel length [mm] | 175 |
| Fluidic seal insert length [mm] | 60 |
| Housing surface roughness [μm] | 1.87 |
| Rotor surface roughness [μm] | 1.40 |

Apparatus

Pressures were measured using a 16 channel multiple transducer Scanivalve module (Model DSA3217). This was used to measure pressure in the inlet, jet and outlet plenum chambers. The Scanivalve is accurate to 0.05% full scale and has transducers with two pressure ranges; high range 0-250 PSI (0-17.2 bar) and low range 0-100 PSI (0-6.8 bar).

Calculations have shown that the velocity is small enough that the dynamic pressure is approximately 0.72% of stagnation pressure at the maximum expected mass flow rate, and so the measured static pressure can be assumed to be the stagnation pressure.

Mass Flow Measurement

The orifice plate that forms part of the fluidic seal test facility (orifice plate 2) is designed for a mass flow rate range of 0.014 to 0.2 kgs$^{-1}$ and conforms to BS EN ISO 5167-2 [1]. Static pressure upstream of the orifice plate and orifice plate differential pressure are measured using two Sensortechnics precision pressure transmitters. Static temperature upstream of the orifice plate is calculated iteratively from the stagnation temperature and mass flow rate. Stagnation temperature is measured by a thermocouple in the air reservoir.

Calculating the orifice plate uncertainty as per BS EN ISO 5167-1/2 ([1] and [2]) gives an uncertainty range from >20% to 1.1%. As shown in FIG. 27, the high uncertainty quickly drops below 2% at mass flow rates over 0.06 kgs$^{-1}$, and so was deemed acceptable. The orifice plate pressures and tank temperature measurements are logged using a National Instruments USB6218 data acquisition system operated by the Durham Software for Windtunnels package. This is initiated with the Scanivalve for pressure measurements by a triggering system developed for the blowdown facility. This ensures all measurements are at the same point in time.

For smaller fluidic seal geometries, as investigated in this study, the orifice plate at jet inlet can be reconfigured for smaller mass flow rates (denoted as orifice plate 2-B in FIG. 27). Using the standard design (orifice plate 2-A) will result with an unacceptably high uncertainty at all ranges of mass flow measurement. The orifice plate is reconfigured by a removable insert with a smaller inner diameter. This allows the orifice plate to function as before, but with a smaller orifice diameter.

The orifice plate mass flow measurements have been calculated using an Octave script which also outputs the uncertainty and the pressure drop across the orifice plate. The code calculates the mass flow according to BS EN ISO 5167-1:2003 [2] and takes into account changes in the discharge coefficient due to compressibility.

The existing orifice plate was calibrated by measuring the jet mass flow rate with the inlet valve shut at various jet mass flow rates. The two measured mass flow rates should be the same. At mass flow rates below 0:01 kgs$^{-1}$ there is a significant difference between the measured mass flow rates. The orifice plates were changed over and orifice plate 2 still recorded a lower mass flow rate; hence the difference could not be attributed to leakage from the pipes between the orifice plates. The differential pressure transducer was tested at zero differential pressure at common pressures up to 5 bar. These tests showed that the effects of temperature and common pressure rejection can not explain these differences in mass flow rates. Therefore it is suggested that error in mass flow is due to geometrical error such as eccentricity of the orifice and pipe bore. The error in mass flows were corrected by a linear correction factor for each orifice plate. When these factors are applied to the experimental results they give an inlet mass flow that is approximately zero just before flow reversal. This suggests that the correction factors are a good approximation to the actual mass flow rates. To eliminate the mass flow measurement errors, a new orifice plate has been developed which ensures the orifice is aligned with the pipe bore, and is detailed below.

New Orifice Plate Design

The current design of orifice plates have no precise means of ensuring the alignment of the pipe bore and the orifice bore. This could be the cause of the mass flow discrepancy between the two orifice plates when measuring the same mass flow. By implementing the improved orifice plate design the repeatability of the mass flow rates will be improved and the mass flow discrepancy eliminated. The current orifice plate design is also integral to the mounting. To facilitate different mass flow rates when testing different seal designs, the design allows the orifice plate to be detached from the mounting. This can then be replaced with another plate of a smaller or larger inner diameter.

FIG. 28 shows the improved orifice plate design. The orifice plate is simply a 3 mm thick circular stainless steel plate with the required inner diameter orifice and four bolt holes.

This is then held by the orifice plate mount which attaches the orifice plate to the pipe flange. The mounting has the required geometry to make the continuous annular slot and the pressure tapping. The orifice plate itself is aligned to the centre of the mounting by a lip around the circumference of the mounting, as shown in FIG. 28, and is sealed by an O ring on each side. The orifice plated can be replaced by removing the bolts through the flange and the mounting. The orifice plate meets all requirements of BS EN ISO 5167-1/2 [1] and [2].

APPENDIX D-SIMPLE FLUIDIC JET

The test rig was used to investigate the same geometry as installed in a prototype turbo-expander, as detailed by [3]. CFD was used to investigate the same fluidic jet design installed in the rig, followed by experimental testing in the rig. The CFD helped to inform the set up of the rig and has also provided some useful insights into why a simple fluidic jet has such a good performance improvement in the turbo-expander, and why this improvement will not be as marked when installed in the rig.

A. Seal Design

The simple fluidic seal is designed to have the same geometry as the seal detailed by [3]. The geometrical parameters can be found in Table 10. The seal has been implemented in the rig by a seal insert in two parts manufactured from PVC, and held apart by 1 mm shims. FIG. 29 shows the detail of the jet design and FIG. 30 shows the two inserts before they were installed in the rig.

The two inserts were originally held apart by a rapid prototype ring which had the advantage that it could be removed easily on disassembly. However it was found that the seal insert and the rapid prototype ring compressed when inside the rig which caused the jet to be completely blocked. The rapid prototype ring was replaced with brass shims attached with double sided tape. However it was still found that the jet closed up due to the PVC insert compressing and therefore extra 0.3 mm shims were added to the 1.0 mm shims to allow for the compression. Several tests were conducted without the rotor so the jet could be observed; it was found that the jet was continuous around the housing. To avoid these problems for future testing the design of fluidic jet insert has been revised to include integral spacers milled into the down stream insert.

The spacers also act to centralise the two parts to ensure the jet is of equal width around the circumference. Details of the new design are given as follows.

Improved Fluidic Seal Insert Design

Problems were encountered while testing with the fluidic seal inserts manufactured for the test rig. These problems were compression of the inserts, which blocked the jet, and eccentricity of the two inserts which produced a fluidic jet of varying thickness around the circumference. To counter these defects the insert design has been modified and is described below.

The new fluidic seal inserts are to be manufactured from steel. This will ensure that the inserts do not deform when the rig is assembled. Integral spacers have been included on the downstream insert as shown in FIG. 31. To ensure that the inserts are aligned centrally there is a rim on the raised spacer. To allow the jet flow to pass through the inserts the raised spacer and alignment rim is milled away to leave four equally spaced sections, as shown in FIG. 32.

B. Simple Fluidic Jet CFD Simulations

Two cases were run with the same simple fluidic seal in the test rig geometry, with minor differences in the detail of the fluidic jet. Case 1 refers to the first CFD simulations with a longer jet length of 21.6 mm and slightly narrower jet of 0.025 mm. Case 2 refers to a jet with the same length and width as the CFD study by [3] for the prototype turbo-expander (0.56 mm long and 0.03536 mm wide). The test conditions are summarised in table 10 for comparison. The working fluid in these tests is air, however [3] have used refrigerant R245fa. The definition of pressure ratio (PR) for all simple fluidic jet tests is given by Equation 6.

$$PR = \left| \frac{p_j - p_o}{p_j - p_o} \right| \quad \text{Equation 6}$$

TABLE 10

TEST CONDITIONS FOR CASE 1 AND 2 AND THE TURBO-EXPANDER FROM AULD ET AL

| Condition | Units | Case 1 | Case 2 | Turbo-expander |
|---|---|---|---|---|
| Inlet Stagnation Pressure | bar | 2.5 | 2.5 | 4.67 |
| Outlet Pressure | bar | 2.0 | 2.0 | 4.14 |
| Mean Radius | mm | 56.65 | 56.65 | 31.5 |
| Shroud Clearance | mm | 0.3 | 0.3 | 0.3 |
| Air Curtain angle | ° | 45 | 45 | 45 |
| Air Curtain thickness | mm | 0.025 | 0.03536 | 0.03536 |
| Air Curtain length | mm | 21.6 | 0.56 | 0.56 |
| Inlet temperature | K | 300 | 300 | 412.7 |
| Air curtain entry area | $10^{-5}$ m$^2$ | 0.892 | 1.28 | 0.700 |
| Leakage channel area | $10^{-4}$ m$^2$ | 1.07 | 1.07 | 0.597 |

FIG. 33 shows the leakage mass flow rates for the case 1 CFD simulation. The total mass flow rate shows little overall improvement even at the maximum pressure ratio tested. A pressure ratio of 22 is approximately ten times greater than typical tests with a shorter jet length to achieve the same leakage performance. The simulations were stopped at PR=22 as no higher pressure ratio would be possible on the test facility. Increasing the pressure ratio beyond PR=22 would reduce the overall leakage mass flow rate until the inlet flow is reversed.

By considering the frictional forces on the fluid from the walls of the jet some simple conclusions can be made. Equation 7 is from the standard definition of friction factor, with mass flow rate substituted for velocity.

$$\frac{F}{L_j} = f \frac{1}{2} \frac{\dot{m}_j^2}{\rho A_j^2} \quad \text{Equation 7}$$

$$f = 0.079 \text{Re}^{-\frac{1}{4}} \quad \text{Equation 8}$$

Combining the Blasius formula for friction factor in a smooth pipe (shown in Equation 8) with Equation 7 and the hydraulic diameter of an annulus dH=2tj gives:

$$\frac{F}{L_j} = 0.0395 \frac{\dot{m}_j^2}{\rho A_j^2} \left( \frac{2 t_j \dot{m}_j}{\rho A_j} \right)^{-\frac{1}{4}} \quad \text{Equation 9}$$

Integrating from the inner radius to the outer radius of the jet gives Equation 10.

$$F = \frac{79 \dot{m}_j^2}{6000 \sin(\alpha) \rho \pi^2 t_j^2} \left[ \frac{\dot{m}_j}{\mu \pi} \right]^{-\frac{1}{4}} (r_{inner}^{-0.75} - r_{outer}^{-0.75}) \quad \text{Equation 10}$$

This shows that increasing the inner jet diameter will reduce the frictional force on the fluid (increasing area reduces the velocity and hence friction acting on the jet) while making the overall jet length as short as possible will also reduce the frictional force on the fluid. Clearly there is a trade off as decreasing the jet velocity will reduce the momentum of the jet for a given mass flow and hence reduce the effectiveness of the jet. This analysis assumes that the jet is short enough that the density of the jet can be assumed constant. For longer jets a numerical analysis can be carried out which includes the effect of changing density. Case 2 used a shorter jet length of 0.56 mm and a jet width of 0.03536 mm (the same width as the prototype turbo-expander and implemented in the test facility, as shown in FIG. 29).

The leakage reduction is much greater for case 2 compared to case 1 with a much lower jet pressure ratio required for the inlet mass flow to reduce to zero (see FIG. 34). However case 2 still compares unfavourably to the CFD calculations run by [3], as shown in FIG. 35, as the pressure ratio required to reduce the leakage into the seal to zero is much higher. The total mass flow rate through the turbo-expander has been normalised by Mach number to the same conditions in case 2 using Equation 11. Case 2 shows a lower reduction in leakage flow than the turbo-expander. At low pressure ratios case 2 shows a slight leakage increment, indicated by A on FIG. 35, which is not present on the turbo-expander mass flow rates. This mass flow increment is also present in FIG. 33 (long jet length).

$$\dot{m}_s = \dot{m} \frac{\sqrt{c_p T_{0i}}}{A_c p_{0i}} \frac{A_{cs} p_{0s}}{\sqrt{c_{ps} T_{0s}}} \quad \text{Equation 11}$$

Table 11 also shows some key differences between case 2 and the turbo-expander. The table includes the sealing capability (Cs) as defined by Equation 12, $$C_s = \frac{p_i - p_o}{\frac{1}{2} \rho_j v_j^2} \quad \text{Equation 12}$$

and the momentum flow per shroud area for the inlet and jet flow. The latter is the momentum flow (rhv) divided by the leakage channel area ($A_c$) and is a measure of the momentum in the flow per seal area. The inlet momentum flow is at PR=1.0 and has been estimated from the stagnation conditions. Jet momentum flow is estimated from the CFD solution just before the inlet flow reversal. The sealing capability of case 2 at the minimum total leakage flow is approximately half that of the turbo-expander. Therefore a greater jet momentum is required to sustain the same pressure difference. This effect could be due to the corners of the shroud housing in the prototype turbo-expander, which cause a pressure loss and reduces the effective pressure difference supported by the fluidic jet.

Also this could be due to the increased density of the fluid through the turbo-expander. This reduces the inlet momentum of the flow as increased density reduces the mean velocity for constant area and mass flow.

Comparing the momentum flow from Table 11 shows the jet momentum flow per shroud area of case 2 is double that of the turbo-expander, which also indicates a greater jet momentum is required to reverse the inlet mass flow of case 2. However the inlet momentum flow of the turbo-expander is not half that of case 2. This indicates that the higher sealing capability and lower jet momentum flow of the turbo-expander is mainly due to the corners of the housing and only partly due to the fluid density.

C. Experimental Results

FIG. 36 shows the experimental mass flows measured for the simple jet. The pressure difference (ΔP) was 0.678 bar. Due to a manufacturing error the leakage channel height was reduced from 0.3 mm to 0.25 mm and the jet width is also increased as discussed above. Therefore the geometry is not fully representative of the geometry tested by [3]. The mass flow has been corrected as described in Appendix C. From the accuracy of the inlet, jet inlet and outlet pressures, and from the definition of pressure ratio by Equation 7, the uncertainty in the calculated pressure ratio can be shown to be given by Equations 12 and 13.

$$\frac{\delta PR}{PR} = 2\left[\frac{\Delta P}{\Delta P - \delta_i - \delta_o} + \frac{\delta_j + \delta_o}{PR(\Delta P - \delta_i - \delta_o)} - 1\right] \quad \text{Equation 12}$$

$$\Delta P = p_i - p_o \quad \text{Equation 13}$$

Applying Equation 12 to the above results gives a maximum error in pressure ratio of 1.1% corresponding to a pressure ratio of 2.6.

The inlet leakage flow is reversed at a pressure ratio of approximately 6.25. When the flow was reversed the inlet valve was fully closed and the inlet pressure was still above the nominal inlet pressure. Comparing the experimental results of FIG. 36 with the CFD results of FIG. 34, the seal shows no total leakage reduction as jet pressure ratio is increased. This is due to the increased thickness of the jet which reduced the momentum per jet mass flow, reducing the effectiveness of the fluidic seal. Leakage flow is reversed at a lower pressure ratio than the CFD results due to the wider jet. This is due to greater mass flow rates although at a lower jet flow momentum per jet mass flow rate. This effect from the increased jet thickness has been found by [3] from CFD analysis.

TABLE 11

KEY CFD RESULTS FOR CASE 2 AND THE TURBO-EXPANDER AULD ET AL [2]

| Condition | Units | Case 2 | Turbo-expander |
|---|---|---|---|
| Total Leakage mass flow | kgs$^{-1}$ | 0.016 | 0.013 |
| Mass flow at inlet to seal | kgs$^{-1}$ | 0.0015 | 0.0008 |
| Air curtain (jet) mass flow | kgs$^{-1}$ | 0.0151 | 0.012 |
| Density at air curtain inlet to leakage channel | kgm$^{-3}$ | 4.1 | 17.4 |
| Air curtain entry area | m$^2$ | 1.28 × 10$^{-5}$ | 7.00 × 10$^{-6}$ |
| Mean Jet velocity at entry | ms$^{-1}$ | 287 | 98 |
| Sealing Capability C$_s$ | — | 0.299 | 0.629 |
| Inlet momentum flow per leakage channel area | kgm$^{-1}$s$^{-2}$ | 17300 | 15300 |
| Jet momentum flow per leakage channel area | kgm$^{-1}$s$^{-2}$ | 40200 | 19800 |
| Pressure Ratio before inlet flow reversal | — | 6.5 | 3.4 |
| Pressure difference across seal | bar | 0.5 | 0.53 |

REFERENCES

[1]. Measurement of fluid flow by means of pressure differential devices inserted in circular cross-section conduits running full—Part 2: Orifice Plates, British Standards Institution, BS EN ISO 5167-2:2003.

[2]. Measurement of fluid flow by means of pressure differential devices inserted in circular cross-section conduits running full—Part 1: General principles and requirements, British Standards Institution, BS EN ISO 5167-1: 2003.

[3]. A. Auld, M. Hilfer, S. Hogg, G. Ingram, and A. Messenger, "Application of an air-curtain fluidic jet type seal to reduce turbine shroud leakage," in Proceedings of ASME Turbo Expo 2013: Power for Land, Sea and Air, San Antonio, Tex., USA, no. GT2013-94198, 2013, accepted for publication.

The invention claimed is:

1. An axial flow turbine comprising
   a turbine rotor mounted within a housing for rotation about a turbine axis,
   a fluid flow inlet passage upstream of said turbine rotor arranged to direct a first fluid towards the turbine rotor in a substantially axial direction,
   a fluid flow outlet passage downstream of said turbine rotor and
   a seal assembly provided in a fluid leakage cavity defined between the turbine rotor and the housing,
   wherein the seal assembly comprises
   a fluid jet outlet configured to admit a second fluid into the fluid leakage cavity in an upstream direction which is inclined to the turbine axis, wherein the fluid jet outlet is defined by a wall of the housing which lies radially outboard of the turbine rotor,
   a first flow restriction located downstream of the fluid jet outlet and at a location such that second fluid admitted from the fluid jet outlet would impinge on the first flow restriction once the second fluid has turned to flow in an axial direction, and
   a second flow restriction located downstream of the first flow restriction,
   wherein the first flow restriction is spaced from the centre of the fluid jet outlet by a distance that is one of (i) one half to twice the radial width of the fluid leakage cavity and (ii) the same distance as the radial width of the fluid leakage cavity.

2. The axial flow turbine of claim 1, wherein the fluid jet outlet is configured to admit the second fluid into the fluid leakage cavity in an upstream direction which is inclined to the turbine axis so as to partially oppose the flow of the first fluid through the fluid leakage cavity.

3. The axial flow turbine of claim 1, wherein the second fluid is ejected from the fluid jet outlet so as to be initially admitted into the fluid leakage cavity in an upstream direction having an axial component and a radial component.

4. The axial flow turbine of claim 1, wherein the pressure of the second fluid exiting the fluid jet outlet is greater than the pressure of the first fluid passing the fluid jet outlet.

5. The axial flow turbine of claim 1, wherein the pressure of the second fluid exceeds a threshold required to cause the second fluid to cross at least half of the radial width of the fluid leakage cavity before it has turned to flow in an axial direction.

6. The axial flow turbine of claim 1, wherein the first flow restriction is located downstream of the fluid jet outlet and at a location such that, in use, second fluid admitted from the fluid jet outlet would impinge on the first flow restriction once the second fluid has turned to flow in an axial direction under the influence of flow of the first fluid through the fluid leakage cavity.

7. The axial flow turbine of claim 1, wherein the first flow restriction is located on an opposite side of the fluid leakage cavity to a side from which the second fluid is admitted into the fluid leakage cavity via the fluid jet outlet.

8. The axial flow turbine of claim 1, wherein the first flow restriction is provided on the radially inboard side of the fluid leakage cavity and the fluid jet outlet is provided on the radially outboard side of the fluid leakage cavity.

9. The axial flow turbine of claim 1, wherein the first flow restriction is a projection extending radially outwards from the radially outer periphery of the turbine rotor.

10. The axial flow turbine of claim 1, wherein the first flow restriction extends across one of (i) up to 90% of the radial width of the fluid leakage cavity, (ii) at least 5% of the radial width of the fluid leakage cavity, or (iii) up to 90% of the radial width of the fluid leakage cavity and at least 5% of the radial width of the fluid leakage cavity.

11. The axial flow turbine of claim 1, wherein the first flow restriction is defined by a section of the turbine rotor downstream of the fluid jet outlet.

12. The axial flow turbine of claim 1, wherein the second flow restriction is defined by a section of the wall of the housing downstream of the first flow restriction which lies one of (i) radially closer to the turbine rotor than the section of the wall of the housing which defines the fluid jet outlet, (ii) axially closer to the turbine rotor than the section of the wall of the housing which defines the fluid jet outlet, or (iii) radially and axially closer to the turbine rotor than the section of the wall of the housing which defines the fluid jet outlet.

13. A turbomachine comprising the axial flow turbine of claim 1.

14. A method for sealing a fluid leakage cavity in an axial flow turbine, the turbine comprising
a turbine rotor mounted within a housing for rotation about a turbine axis,
a fluid flow inlet passage upstream of said turbine rotor arranged to direct a first fluid towards the turbine rotor in a substantially axial direction,
a fluid flow outlet passage downstream of said turbine rotor and
a seal assembly provided in said fluid leakage cavity defined between the turbine rotor and the housing,
wherein the method comprises
directing the first fluid towards the turbine rotor in a substantially axial direction, a portion of the first fluid flowing through the turbine rotor and a further portion flowing through the fluid leakage cavity
admitting a second fluid from a fluid jet outlet into the fluid leakage cavity in an upstream direction which is inclined to the turbine axis, wherein the fluid jet outlet is defined by a wall of the housing which lies radially outboard of the turbine rotor,
providing a first flow restriction downstream of the fluid jet outlet and at a location such that second fluid admitted from the fluid jet outlet impinges on the first flow restriction once the second fluid has turned to flow in an axial direction after contacting the further portion of the first fluid flowing through the fluid leakage cavity, and
providing a second flow restriction downstream of the first flow restriction to restrict the flow of a mixture of said first and second fluids further through the fluid leakage cavity,
wherein the first flow restriction is spaced from the centre of the fluid jet outlet by a distance that is one of (i) one half to twice the radial width of the fluid leakage cavity and (ii) the same distance as the radial width of the fluid leakage cavity.

15. An axial flow turbine comprising
a turbine rotor mounted within a housing for rotation about a turbine axis,
a fluid flow inlet passage upstream of said turbine rotor arranged to direct a first fluid towards the turbine rotor in a substantially axial direction,
a fluid flow outlet passage downstream of said turbine rotor and
a seal assembly provided in a fluid leakage cavity defined between the turbine rotor and the housing,
wherein the seal assembly comprises
a fluid jet outlet configured to admit a second fluid into the fluid leakage cavity in an upstream direction which is inclined to the turbine axis, wherein the fluid jet outlet is defined by a wall of the housing which lies radially outboard of the turbine rotor,
a first flow restriction located downstream of the fluid jet outlet and at a location such that second fluid admitted from the fluid jet outlet would impinge on the first flow restriction once the second fluid has turned to flow in an axial direction, and
a second flow restriction located downstream of the first flow restriction,
wherein the first flow restriction extends across one of (i) up to 90% of the radial width of the fluid leakage cavity, (ii) at least 5% of the radial width of the fluid leakage cavity, or (iii) up to 90% of the radial width of the fluid leakage cavity and at least 5% of the radial width of the fluid leakage cavity.

16. A method for sealing a fluid leakage cavity in an axial flow turbine, the turbine comprising
a turbine rotor mounted within a housing for rotation about a turbine axis,
a fluid flow inlet passage upstream of said turbine rotor arranged to direct a first fluid towards the turbine rotor in a substantially axial direction,
a fluid flow outlet passage downstream of said turbine rotor and
a seal assembly provided in said fluid leakage cavity defined between the turbine rotor and the housing,
wherein the method comprises
directing the first fluid towards the turbine rotor in a substantially axial direction, a portion of the first fluid flowing through the turbine rotor and a further portion flowing through the fluid leakage cavity
admitting a second fluid from a fluid jet outlet into the fluid leakage cavity in an upstream direction which is inclined to the turbine axis, wherein the fluid jet outlet is defined by a wall of the housing which lies radially outboard of the turbine rotor,
providing a first flow restriction downstream of the fluid jet outlet and at a location such that second fluid admitted from the fluid jet outlet impinges on the first flow restriction once the second fluid has turned to flow in an axial direction after contacting the further portion of the first fluid flowing through the fluid leakage cavity, and
providing a second flow restriction downstream of the first flow restriction to restrict the flow of a mixture of said first and second fluids further through the fluid leakage cavity,
wherein the first flow restriction extends across one of (i) up to 90% of the radial width of the fluid leakage cavity, (ii) at least 5% of the radial width of the fluid leakage cavity, or (iii) up to 90% of the radial width of the fluid leakage cavity and at least 5% of the radial width of the fluid leakage cavity.

* * * * *